US011371379B2

(12) United States Patent
van der Merwe et al.

(10) Patent No.: US 11,371,379 B2
(45) Date of Patent: Jun. 28, 2022

(54) TURBOMACHINE WITH ALTERNATINGLY SPACED TURBINE ROTOR BLADES

(71) Applicant: General Electric Company, Schenectady, NY (US)

(72) Inventors: Gert Johannes van der Merwe, Lebanon, OH (US); Darek Tomasz Zatorski, Fort Wright, KY (US)

(73) Assignee: General Electric Company, Schenectady, NY (US)

(*) Notice: Subject to any disclaimer, the term of this patent is extended or adjusted under 35 U.S.C. 154(b) by 308 days.

(21) Appl. No.: 16/046,054

(22) Filed: Jul. 26, 2018

(65) Prior Publication Data

US 2019/0085715 A1 Mar. 21, 2019

Related U.S. Application Data

(60) Provisional application No. 62/548,666, filed on Aug. 22, 2017.

(51) Int. Cl.
*F01D 15/10* (2006.01)
*F01D 5/03* (2006.01)
(Continued)

(52) U.S. Cl.
CPC .............. *F01D 15/10* (2013.01); *F01D 1/24* (2013.01); *F01D 5/03* (2013.01); *F02C 3/067* (2013.01);
(Continued)

(58) Field of Classification Search
CPC .............. F01D 15/10; F01D 1/24; F01D 1/26; F01D 5/03; F01D 19/00; F01D 5/026;
(Continued)

(56) References Cited

U.S. PATENT DOCUMENTS 2,429,061 A 10/1947 Hunter
6,263,664 B1 7/2001 Tanigawa et al.
(Continued)

FOREIGN PATENT DOCUMENTS

EP 1577491 A1 9/2005
GB 2 225 297 A 5/1990

OTHER PUBLICATIONS

Extended European Search Report and Opinion issued in connection with corresponding EP Application No. 18190080.4 dated Jan. 11, 2019.

(Continued)

*Primary Examiner* — Woody A Lee, Jr.
*Assistant Examiner* — Elton K Wong
(74) *Attorney, Agent, or Firm* — Dority & Manning, P.A.

(57) ABSTRACT

An engine assembly includes an engine including a component and defining an opening and an interior, the component including a first side and an opposite second side, the second side positioned within the interior of the engine. The engine assembly also includes an inspection tool having a first member including at least one of a receiver or a transmitter and directed at the first side of the component. The inspection tool also includes a second member including the other of the receiver or the transmitter and positioned at least partially within the interior of the engine and directed at the second side of the component to communicate a signal with the first member through the component, the second member being a robotic arm extending through the opening of the engine.

17 Claims, 23 Drawing Sheets

(51) Int. Cl.

| | |
|---|---|
| ***F02C 3/107*** | (2006.01) |
| ***F01D 1/24*** | (2006.01) |
| ***F02C 3/067*** | (2006.01) |
| ***F02K 3/06*** | (2006.01) |
| ***F02C 7/32*** | (2006.01) |
| ***H02K 7/18*** | (2006.01) |

(52) U.S. Cl.
CPC ................ *F02C 3/107* (2013.01); *F02C 7/32* (2013.01); *F02K 3/06* (2013.01); *H02K 7/1823* (2013.01); *F05D 2220/323* (2013.01); *F05D 2220/76* (2013.01); *F05D 2240/24* (2013.01); *F05D 2260/40311* (2013.01)

(58) Field of Classification Search
CPC ......... F02C 3/067; F02C 7/32; H02K 7/1823; F05D 2220/76; F05D 2220/762; F05D 2220/764; F05D 2220/7642; F05D 2220/7644; F05D 2220/7646; F04D 19/024
See application file for complete search history.

(56) References Cited

U.S. PATENT DOCUMENTS

| | | | | |
|---|---|---|---|---|
| 7,451,592 | B2 | 11/2008 | Taylor et al. | |
| 7,514,810 | B2 | 4/2009 | Kern et al. | |
| 7,685,828 | B2 | 3/2010 | Foucault et al. | |
| 7,966,833 | B2 | 6/2011 | Beutin et al. | |
| 8,093,747 | B2 | 1/2012 | Pearson et al. | |
| 8,314,505 | B2 | 11/2012 | McLoughlin et al. | |
| 8,375,695 | B2 | 2/2013 | Schilling et al. | |
| 8,511,976 | B2 | 8/2013 | Cummins et al. | |
| 8,890,343 | B2 | 11/2014 | Bulin et al. | |
| 8,967,967 | B2 | 3/2015 | Stretton et al. | |
| 9,517,843 | B2 | 12/2016 | Pesyna et al. | |
| 2010/0154384 | A1* | 6/2010 | Schilling | F01D 5/06 60/268 |
| 2013/0056982 | A1* | 3/2013 | Gozdawa | F01D 15/10 290/7 |
| 2015/0377142 | A1* | 12/2015 | Sheridan | F02C 7/275 60/778 |
| 2016/0149469 | A1* | 5/2016 | Lemmers | F01D 15/10 290/1 A |
| 2016/0164372 | A1* | 6/2016 | Zehnle | H02K 1/185 290/52 |

OTHER PUBLICATIONS

Canadian Office Action Issued in Connection to Corresponding Application No. 3013727 dated Jun. 7, 2019.

Eurogean Office Action Corresgonding to Application No. 18190080 dated Mar. 16, 2020.

* cited by examiner

A
R
10
12
14
16
18
20
22
24
26
28
30
32
34
36
37
38
40
42
44
46
48
50
52
54
56
58
60
62
64
66
68
70
72
73
74
75
76
78
80
82
84
P 100
102
104
106
106A
106B
106C
108
108A
108B
108C
110
112
114
116
118
120
122
124
126
128
130
134
150
152
156
172
174
176
200
202
204
206
208
210
A
R 220
10
80
82
84
32
30
73
66
78
36
28
73
74
75
76
54
62
16
230
66
68
37
170
72
26
18
228
56
52
46
24
37
224
P
64
22
20
14
62
42
44
38
40
50
226
58
48
60
A
R

TURBOMACHINE WITH ALTERNATINGLY SPACED TURBINE ROTOR BLADES

CROSS-REFERENCE TO RELATED APPLICATIONS

This application is a non-provisional application claiming the benefit of priority under 35 U.S.C. § 119(e) to U.S. Provisional Application No. 62/548,666 filed Aug. 22, 2017, which is hereby incorporated by reference in its entirety.

FIELD

The present subject matter relates generally to a turbomachine, and more particularly, to a turbine of a turbomachine having alternatingly spaced turbine rotor blades.

BACKGROUND

Typical aircraft propulsion systems include one or more gas turbine engines. For certain propulsion systems, the gas turbine engines generally include a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

General gas turbine engine design criteria often include conflicting criteria that must be balanced or compromised, including increasing fuel efficiency, operational efficiency, and/or power output while maintaining or reducing weight, part count, and/or packaging (i.e., axial and/or radial dimensions of the engine). Accordingly, at least certain gas turbine engines include interdigitated rotors. For example, a turbine section may include a turbine having a first plurality of low speed turbine rotor blades and a second plurality of high speed turbine rotor blades. The first plurality of low speed turbine rotor blades may be interdigitated with the second plurality of high speed turbine rotor blades. Such a configuration may result in a more efficient turbine. However, several problems may arise with such a configuration relating to unwanted vibrations, clearance issues between the first and second pluralities of rotor blades, etc.

Moreover, for at least certain propulsion systems including the above gas turbine engines, it may be beneficial to include an electric fan to supplement propulsive power provided by the one or more gas turbine engines included with the propulsion system. However, inclusion of a sufficient amount of energy storage devices with the propulsion system to power the electric fan may be space and weight prohibitive. Notably, certain gas turbine engines may include auxiliary generators positioned, e.g., within a cowling of the gas turbine engine. However, these auxiliary generators are not configured to provide a sufficient amount of electrical power to adequately drive the electric fan.

Accordingly, a propulsion system for an aircraft having one or more gas turbine engines and electric generators capable of providing an electric fan, or other electric propulsor, with a desired amount of electrical power would be useful. Additionally, a propulsion system including a gas turbine engine with a turbine capable of overcoming the various issues with the interdigitated rotors that additionally overcomes the above issues that may arise therewith would be particularly useful.

BRIEF DESCRIPTION

Aspects and advantages of the invention will be set forth in part in the following description, or may be obvious from the description, or may be learned through practice of the invention.

In one embodiment of the present disclosure, a turbomachine defining a radial direction and an axial direction is provided. The turbomachine includes a turbine section including a turbine frame and a turbine. The turbine includes a first plurality of turbine rotor blades and a second plurality of turbine rotor blades, the first plurality of turbine rotor blades and second plurality of turbine rotor blades alternatingly spaced along the axial direction. The turbomachine also includes a gearbox, the first plurality of turbine rotor blades and second plurality of turbine rotor blades rotatable with one another through the gearbox. The turbomachine also includes an electric machine assembly including a rotary connection member and an electric machine, the rotary connection member coupled to the first plurality of turbine rotor blades or the second plurality of turbine rotor blades, the electric machine including a rotor and a stator, the rotary connection member drivingly coupled to the rotor.

In certain exemplary embodiments the turbomachine further includes a first support member; and a spool, wherein the first plurality of turbine rotor blades is coupled to the spool through the first support member, and wherein the rotary connection member of the electric machine assembly is coupled to the first support member.

For example, in certain exemplary embodiments the turbomachine further includes a first bearing assembly; and a second support member, the second plurality of turbine rotor blades supported by the second support member, wherein the spool and first support member are supported within the turbine section substantially completely through the bearing assembly positioned between the first support member and second support member.

For example, in certain exemplary embodiments the turbomachine further includes a second bearing assembly, wherein the second support member is supported by the turbine frame through the second bearing assembly.

In certain exemplary embodiments the first plurality of turbine rotor blades is configured as a plurality of low-speed turbine rotor blades, and wherein the second plurality of turbine rotor blades is configured as a plurality of high-speed turbine rotor blades.

For example, in certain exemplary embodiments the electric machine assembly further includes an electric machine gearbox, wherein the rotary connection member is drivingly coupled to the rotor of the electric machine through the electric machine gearbox.

For example, in certain exemplary embodiments the electric machine gearbox defines a gear ratio greater than 1:1 to increase a rotational speed of the rotor of the electric machine relative to the rotary connection member.

In certain exemplary embodiments the electric machine gearbox is includes a first gear coupled to the first plurality of rotor blades, a second gear coupled to the second plurality of rotor blades, and a third gear coupled to the turbine frame.

In certain exemplary embodiments the first plurality of turbine rotor blades is configured as a plurality of high-speed turbine rotor blades, and wherein the second plurality of turbine rotor blades is configured as a plurality of low-speed turbine rotor blades.

For example, in certain exemplary embodiments the rotor of the electric machine of the electric machine assembly is configured to rotate at the same rotational speed as the plurality of high-speed turbine rotor blades.

For example, in certain exemplary embodiments the electric machine assembly further includes an electric machine gearbox, and wherein the rotor of the electric machine is drivingly coupled to the rotary connection member through the electric machine gearbox.

In certain exemplary embodiments the turbine frame is a turbine center frame, wherein the turbine section further includes a turbine rear frame, and wherein the stator of the electric machine of the electric machine assembly is coupled to the turbine rear frame.

In certain exemplary embodiments each turbine rotor blade of the first plurality of turbine rotor blades extends between a radially inner end and a radially outer end, and wherein at least two of the turbine rotor blades of the first plurality of turbine rotor blades are spaced from one another along the axial direction and coupled to one another at the radially outer ends.

In certain exemplary embodiments each turbine rotor blade of the second plurality of turbine rotor blades extends between a radially inner end and a radially outer end, and wherein at least two of the turbine rotor blades of the second plurality of turbine rotor blades are spaced from one another along the axial direction and coupled to one another at the radially inner ends.

In certain exemplary embodiments the first plurality of turbine rotor blades are configured to rotate in a first circumferential direction, and wherein the second plurality of turbine rotor blades are configured to rotate in a second circumferential direction opposite the first circumferential direction.

In certain exemplary embodiments the electric machine assembly is positioned aft of the turbine.

In certain exemplary embodiments the electric machine of the electric machine assembly is configured to generate at least about 100 kilowatts of electrical power during operation.

In certain exemplary embodiments the turbine is a first turbine, wherein the turbine section further includes a second turbine, and wherein the turbomachine further includes a first spool coupled to the first turbine; a second spool coupled to the second turbine; and a one-way clutch, the first spool selectively coupled to the second spool through the one-way clutch.

For example, in certain exemplary embodiments the one-way clutch is positioned between the first spool and the second spool.

For example, in certain exemplary embodiments the first turbine is a low pressure turbine, wherein the first spool is a low pressure spool, wherein the second turbine is a high pressure turbine, and wherein the second spool is a high pressure spool.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
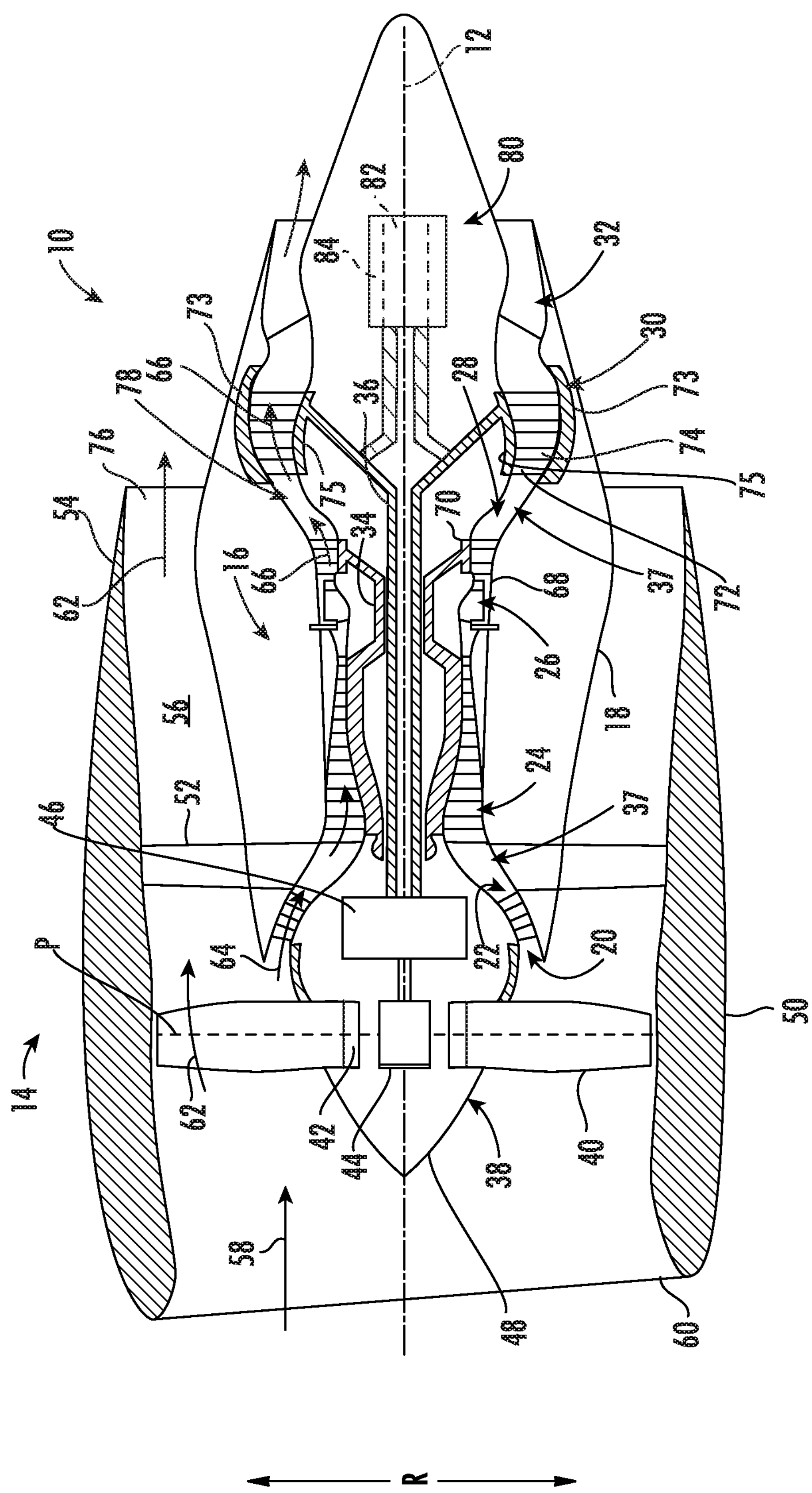
FIG. 1 is a schematic cross sectional view of an exemplary gas turbine engine incorporating an exemplary embodiment of a turbine section according to an aspect of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Part A

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction (i.e., a direction extending about the axial direction A; not depicted). In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. The compressor section, combustion section 26, and turbine section together define a core air flowpath 37 extending from the annular inlet 20 through the LP compressor 22, HP compressor 24, combustion section 26, HP turbine section 28, LP turbine section 30 and jet nozzle exhaust section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that for the embodiment depicted, the nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of a first plurality of LP turbine rotor blades 72 that are coupled to an outer drum 73, and a second plurality of turbine rotor blades 74 that are coupled to an inner drum 75. The first plurality of turbine rotor blades 72 and second plurality of turbine rotor blades 74 are alternatingly spaced and rotatable with one another through a gearbox (not shown) to together drive the LP shaft or spool 36, thus causing the LP shaft or spool 36 to rotate. Such thereby supports operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

Additionally, the exemplary turbofan 10 depicted includes an electric machine 80 rotatable with the fan 38. Specifically, for the embodiment depicted, the electric machine 80 is co-axially mounted to and rotatable with the LP shaft 36 (the LP shaft 36 also rotating the fan 38 through, for the embodiment depicted, the power gearbox 46). As used herein, "co-axially" refers to the axes being aligned. It should be appreciated, however, that in other embodiments, an axis of the electric machine 80 may be offset radially from the axis of the LP shaft 36 and further may be oblique to the axis of the LP shaft 36, such that the electric machine 80 may be positioned at any suitable location at least partially inward of the core air flowpath 37.

The electric machine 80 includes a rotor 82 and a stator 84. In certain exemplary embodiments, the rotor 82 and stator 84 of the electric machine 80 are configured in substantially the same manner as the exemplary rotor 208 and stator 210 of the electric machine 202 described below. It will further be appreciated that, in certain exemplary embodiments, the turbofan engine 10 may be integrated into a propulsion system. With such an exemplary embodiment, the electric machine 80 may be electrically connected, or connectable, to one or more electric propulsion devices of the propulsion system (such as one or more electric fans), one or more power storage devices, etc.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the turbine fan engine 10 may instead be configured as any other suitable turbomachine including, e.g., any other suitable number of shafts or spools, and excluding, e.g., the power gearbox 46 and/or fan 38, etc. Accordingly, it will be appreciated that in other exemplary embodiments, the turbofan engine 10 may instead be configured as, e.g., a turbojet engine, a turboshaft engine, a turboprop engine, etc.

Figure 2:
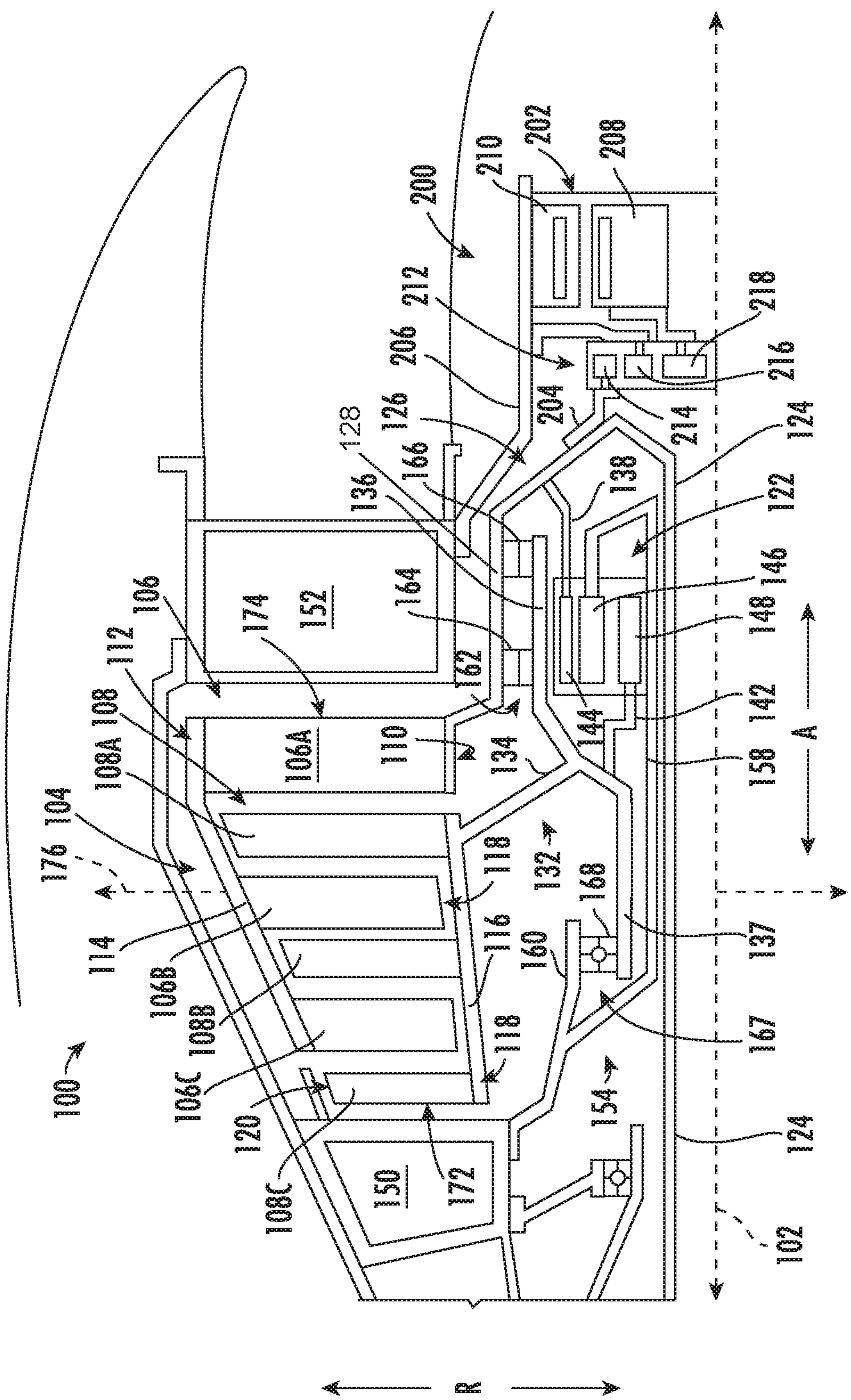
FIG. 2 is a close-up, schematic, cross sectional view of a turbine section in accordance with yet another exemplary aspect of the present disclosure.

Referring now to FIG. 2, a schematic, side, cross-sectional view is provided of a turbine section 100 of a turbomachine in accordance with an exemplary embodiment of the present disclosure. The exemplary turbine section 100 depicted in FIG. 2 may be incorporated into, e.g., the exemplary turbofan engine 10 described above with reference to FIG. 1. However, in other exemplary embodiments, the turbine section 100 may be integrated into any other suitable machine utilizing a turbine.

Accordingly, it will be appreciated that the turbomachine generally defines a radial direction R, an axial direction A, and a longitudinal centerline 102. Further, the turbine section 100 includes a turbine 104, with the turbine 104 of the turbine section 100 being rotatable about the axial direction A (i.e., includes one or more components rotatable about the axial direction A). For example, in certain embodiments, the turbine 104 may be a low pressure turbine (such as the exemplary low pressure turbine 30 of FIG. 1), or alternatively may be any other turbine (such as, a high pressure turbine, an intermediate turbine, a dual use turbine functioning as part of a high pressure turbine and/or a low pressure turbine, etc.).

Moreover, for the exemplary embodiment depicted, the turbine 104 includes a plurality of turbine rotor blades spaced along the axial direction A. More specifically, for the exemplary embodiment depicted, the turbine 104 includes a first plurality of turbine rotor blades 106 and a second plurality of turbine rotor blades 108. As will be discussed in greater detail below, the first plurality of turbine rotor blades 106 and second plurality of turbine rotor blades 108 are alternatingly spaced along the axial direction A.

Referring first to the first plurality of turbine rotor blades 106, each of the first plurality of turbine rotor blades 106 extends generally along the radial direction R between a radially inner end 110 and a radially outer end 112. Additionally, the first plurality of turbine rotor blades 106 includes a first turbine rotor blade 106A, a second turbine rotor blade 106B, and a third turbine rotor blade 106C, each spaced apart from one another generally along the axial direction A. At least two of the first plurality of turbine rotor blades 106 are spaced from one another along the axial direction A and coupled to one another at the respective radially outer ends 112. More specifically, for the embodiment depicted, each of the first turbine rotor blade 106A, the second turbine rotor blade 106B, and the third turbine rotor blade 106C are coupled to one another through their respective radially outer ends 112. More specifically, still, each of the first turbine rotor blade 106A, the second turbine rotor blade 106B, and the third turbine rotor blade 106C of the first plurality of turbine rotor blades 106 are coupled at their respective radially outer ends 112 through an outer drum 114.

Further, the second plurality of turbine rotor blades 108, each also extend generally along the radial direction R between a radially inner end 118 and a radially outer end 120. Additionally, for the embodiment depicted, the second plurality of turbine rotor blades 108 includes a first turbine rotor blade 108A, a second turbine rotor blade 108B, and a third turbine rotor blade 108C, each spaced apart from another generally along the axial direction A. For the embodiment depicted, at least two of the second plurality of turbine rotor blades 108 are spaced from one another along the axial direction A and coupled to one another at the respective radially inner ends 118. More specifically, for the embodiment depicted, each of the first turbine rotor blade 106A, the second turbine rotor blade 106B, and the third turbine rotor blade 108C of the second plurality of turbine rotor blades 108 are coupled to one another through their respective radially inner ends 118. More specifically, still, each of the first turbine rotor blade 108A, the second turbine rotor blade 108B, and the third turbine rotor blade 108C of the second plurality of turbine rotor blades 108 are coupled at their respective radially inner ends 118 through an inner drum 116.

It should be appreciated, however, that in other exemplary embodiments, the first plurality of turbine rotor blades 106 and/or the second plurality of turbine rotor blades 108 may be coupled together in any other suitable manner, and that as used herein, "coupled at the radially inner ends" and "coupled at the radially outer ends" refers generally to any direct or indirect coupling means or mechanism to connect the components. For example, in certain exemplary embodiments, the second plurality of turbine rotor blades 108 may include multiple stages of rotor (not shown) spaced along the axial direction A, with the first turbine rotor blade 108A, the second turbine rotor blade 108B, and the third turbine rotor blade 108C coupled to the respective stages of rotors at the respectively radially inner ends 118 through, e.g. dovetail base portions. The respective stages of rotors may, in turn, be coupled together to therefore couple the second plurality of turbine rotor blades at their respective radially inner ends 118.

Referring still to the embodiment depicted in FIG. 2, as stated, all the first plurality of turbine rotor blades 106 and the second plurality of turbine rotor blades 108 are alternatingly spaced along the axial direction A. As used herein, the term "alternatingly spaced along the axial direction A" refers to the second plurality of turbine rotor blades 108 including at least one turbine rotor blade positioned along the axial direction A between two axially spaced turbine rotor blades of the first plurality of turbine rotor blades 106. For example, for the embodiment depicted, alternatingly spaced along the axial direction A refers to the second plurality of turbine rotor blades 108 including at least one turbine rotor blade positioned between the first and second turbine rotor blades 106A, 106B of the first plurality of turbine rotor blades 106 along the axial direction A, or between the second and third turbine rotor blades 106B, 106C of the first plurality of turbine rotor blades 106 along the axial direction A. More specifically, for the embodiment depicted, the first turbine rotor blade 106A of the first plurality of turbine rotor blades 106 is positioned aft of the first turbine rotor blade 108A of the second plurality of turbine rotor blades 108; the second turbine rotor blade 106B of the first plurality of turbine rotor blades 106 is positioned between the first and second turbine rotor blades 108A, 108B of the second plurality of turbine rotor blades 108; and the third turbine rotor blade 106C of the first plurality of turbine rotor blades 106 is positioned between the second and third turbine rotor blades 108B, 108C of the second plurality of turbine rotor blades 108.

Notably, however, in other exemplary embodiments, the first plurality of turbine rotor blades 106 may have any other suitable configuration and/or the second plurality of turbine rotor blades 108 may have any other suitable configuration. For example, it will be appreciated that for the embodiments described herein, the first turbine rotor blade 106A, second turbine rotor blade 106B, and third turbine rotor blade 106C of the first plurality of turbine rotor blades 106 generally represent a first stage of turbine rotor blades, a second stage of turbine rotor blades, and a third stage of turbine rotor blades, respectively. It will similarly be appreciated that the first turbine rotor blade 106A, second turbine rotor blade 106B, and third turbine rotor blade 108C of the second plurality of turbine rotor blades 108 each also generally represent a first stage of turbine rotor blades, a second stage of turbine rotor blades, and a third stage of turbine rotor blades, respectively. In other exemplary embodiments, the first plurality of turbine rotor blades 106 and/or the second plurality of turbine rotor blades 108 may include any other suitable number of stages of turbine rotor blades, such as two stages, four stages, etc., and further that in certain exemplary embodiments, the turbine 104 may additionally include one or more stages of stator vanes.

Referring still to the embodiment of FIG. 2, the turbine 104 further defines a midpoint 176 along the axial direction A. As used herein, the term "midpoint" refers generally to an axial location halfway between a forward-most forward edge of a forward-most turbine rotor blade of the turbine 104 and an aft-most aft edge of an aft-most turbine rotor blade of the turbine 104. Accordingly, for the embodiment depicted, the midpoint 176 of the turbine 104 is an axial location halfway between a forward-most forward edge 172 of the third turbine rotor blade 108C of the second plurality of turbine rotor blades 108 and an aft-most aft edge 174 of the first turbine rotor blade 106A of the first plurality of turbine rotor blades 106.

Moreover, for the embodiment depicted, the turbomachine further includes a gearbox 122 and a spool 124, with the first plurality of turbine rotor blades 106 and the second plurality of turbine rotor blades 108 rotatable with one another through the gearbox 122. In at least certain exemplary embodiments, the spool 124 may be configured as, e.g., the exemplary low pressure spool 36 described above with reference to FIG. 1. Additionally, the exemplary turbine section further includes a turbine center frame 150 and a turbine rear frame 152. The gearbox 122 is aligned with, or positioned aft of, the midpoint 176 of the turbine 104, for the embodiment depicted, and more specifically, is aligned with the turbine rear frame 152 along the axial direction A for the embodiment depicted. Notably, as used herein, the term "aligned with" with reference to the axial direction A refers to the two components and/or positions having at least a portion of the same axial position.

It should be appreciated, however, that in other exemplary embodiments, the spool 124 may be any other spool (e.g., a high pressure spool, an intermediate spool, etc.), and further that the gearbox 122 may be any other suitable speed change device positioned at any other suitable location. For example, in other exemplary embodiments, the gearbox 122 may instead be a hydraulic torque converter, an electric machine, a transmission, etc., and may be positioned forward of the midpoint 176 of the turbine 104.

Referring still to FIG. 2, the turbine section 100 includes a first support member assembly 126 having a first support member 128, and a second support member assembly 132 having a second support member 134. The first support member 128 couples the radially inner end 110 of the first turbine rotor blade 106A of the first plurality of turbine rotor blades 106 to the spool 124, and further couples the first plurality of turbine rotor blades 106 to the gearbox 122. Additionally, the second support member 134 similarly couples the second plurality of turbine rotor blades 108, or rather the radially inner end 118 of the first turbine rotor blade 108A of the second plurality of turbine rotor blades 108, to the gearbox 122. Notably, however, in other exemplary embodiments, the first support member 128 may couple to any of the other turbine rotor blades within the first plurality of turbine rotor blades 106 at a radially inner end 110 (either directly or through, e.g., a rotor—not shown), and similarly, the second support member 134 may couple to any of the other turbine rotor blades of the second plurality of turbine rotor blades 108 at the radially inner ends 118, respectively, either directly or through, e.g., a rotor—not shown).

Further, for the embodiment depicted the first support member assembly 126 includes a first flexible connection 138 attached to the first support member 128 at a juncture 140 of the first support member 128 (although, in other embodiments, the first flexible connection 138 may be formed integrally with the first support member 128). Similarly, the second support member assembly includes a second flexible connection 142 attached to, or formed integrally with, the second support member 134. The first flexible connection 138 and second flexible connection 142 allow for a less rigid connection between the gearbox 122 and the first support member 128 and second support member 134, respectively. More particularly, the first flexible connection 138 at the second flexible connection 142 allow for a less rigid connection between the gearbox 122 and the first plurality of turbine rotor blades 106 and the second plurality of turbine rotor blades 108, respectively. In certain embodiments, the first flexible connection 138, the second flexible connection 142, or both, may be configured as members having billows, splined connections with resilient material, etc.

The exemplary gearbox 122 depicted generally includes a first gear coupled to the first plurality of turbine rotor blades 106, a second gear coupled to the second plurality of turbine rotor blades 108, and a third gear coupled to the turbine center frame 150. More specifically, for the embodiment depicted, the gearbox 122 is configured as a planetary gear box. Accordingly, the first gear is a ring gear 144, the second gear is a sun gear 148, and the third gear is a planet gear 146. More specifically, the exemplary turbine section 100 depicted further a center frame support assembly 154 coupled to the turbine center frame 150. The center frame support assembly 154, for the embodiment depicted, includes a radially inner center frame support member 158 and a radially outer center frame support member 160. The plurality of planet gears 146 are fixedly coupled (i.e., fixed along a circumferential direction) to the turbine center frame 150 through the center frame support assembly 154, and more particularly, through the radially inner center frame support member 158 of the center frame support assembly 154.

In such a manner, it will be appreciated that for the embodiment depicted, the first plurality of turbine rotor blades 106 are configured to rotate in an opposite direction than the second plurality of turbine rotor blades 108. For example, the first plurality of turbine rotor blades 106 may be configured to rotate in a first circumferential direction C1 (see FIG. 3, below), while the second plurality of turbine rotor blades 108 may be configured to rotate in a second circumferential direction C2 (see FIG. 3, below), opposite the first circumferential direction C1. It should be understood, however, that although the structures provided herein therefore enable the turbine 104 to "counter-rotate," in other embodiments, the turbine 104 may instead be configured to "co-rotate," wherein the first plurality of turbine rotor blades 106 and the second plurality of turbine rotor blades 108 each rotate the same circumferential direction.

It should further be understood that the first circumferential direction C1 and the second circumferential direction C2 as used and described herein are intended to denote directions relative to one another. Therefore, the first circumferential direction C1 may refer to a clockwise rotation (viewed from downstream looking upstream) and the second circumferential direction C2 may refer to a counter-clockwise rotation (viewed from downstream looking upstream). Alternatively, the first circumferential direction C1 may refer to a counter-clockwise rotation (viewed from downstream looking upstream) and the second circumferential direction C2 may refer to a clockwise rotation (viewed from downstream looking upstream).

It will further be appreciated that for the embodiment depicted, the first plurality of turbine rotor blades 106 is configured as a plurality of low-speed turbine rotor blades, while the second plurality of turbine rotor blades 108 is configured as a plurality of high-speed turbine rotor blades. Such may be due to the gearing of the gearbox 122, as well as a positioning of the third turbine rotor blade 108C of the second plurality of turbine rotor blades 108 forward of the third turbine rotor blade 106C of the first plurality of turbine rotor blades 106. Regardless, it will be appreciated that in such an exemplary embodiment, the first support member 128 of the first support member assembly 126 is a low-speed support member, and further, the second support member of the second support member assembly is configured as a high-speed support member.

As is depicted, the first plurality of turbine rotor blades 106 is coupled to the first gear, i.e., the ring gear 144, of the gearbox 122 through the first support member 128, and the second plurality of turbine rotor blades 108 is coupled to the second gear, i.e., the sun gear 148, of the gearbox 122 through the second support member 134. As is also depicted, the first support member 128 extends aft of the gearbox 122, and more specifically, extends around an aft end of the gearbox 122. More specifically, still, for the embodiment depicted, the first support member 128 extends generally from the radially inner end 110 of the first turbine rotor blade 106A of the first plurality of turbine rotor blades 106 (i.e., a location aligned with, or forward of, the gearbox 122 along the axial direction A), around the aft end of the gearbox 122 and to the spool 124 to mechanically couple the first plurality of turbine rotor blades 106 to the spool 124.

Moreover, the turbomachine includes a first bearing assembly 162 to support the various rotating components of the turbine 104 described herein and further to support the spool 124 within the turbine section 100. More specifically, for the embodiment depicted, the spool 124 and first support member 128 are supported aft of the midpoint 176 of the turbine 104 substantially completely through the first bearing assembly 162. More specifically, still, for the embodiment depicted, the spool 124 and first support member 128 are supported within the turbine section 100 substantially completely through the first bearing assembly 162. As is depicted, and as will be appreciated, for the embodiment of FIG. 2 the first bearing assembly 162 is positioned between the first support member 128 and second support member 134 (or rather between the first support member 128 and an aft arm 136 of the second support member 134), at a location aft of the midpoint 176 of the turbine 104, and radially outward of the gearbox 122. More specifically, still, for the embodiment depicted the first bearing assembly 162 is positioned between the first support member 128 and the second support member 134 at a location aft of an aft-most aft edge of the aft-most turbine rotor blade of the first and second pluralities of turbine rotor blades 106, 108.

Referring still to FIG. 2, for the exemplary embodiment depicted, the first bearing assembly 162 generally includes a first bearing 164 and a second bearing 166. The first and second bearings 164, 166 are each configured as inter-shaft bearings positioned between the first support member 128 and the aft arm 136 of the second support member 134. More specifically, for the embodiment depicted, the first bearing 164 is configured as a roller bearing and the second bearing 166 is configured as a ball bearing. However, in other exemplary embodiments, the first bearing assembly 162 may include any other suitable number of bearings, such as a single bearing, three bearings, etc., with such bearings being configured in any suitable manner.

Furthermore, for the exemplary embodiment depicted, the turbomachine further comprises a second bearing assembly 167. The second bearing assembly 167 is further configured to rotatably support the second support member 134, and more specifically, is configured to support a forward arm 137 of the second support member 134. The second bearing assembly 167, for the embodiment depicted, includes a first bearing 168 supported by the turbine center frame 150 through the radially outer center frame support member 160.

Such a configuration may allow for the turbine 104 to be supported substantially completely through the turbine center frame 150. Accordingly, such may allow for a lighter turbine rear frame 152 and a more aerodynamic turbine rear frame 152.

Figure 3:
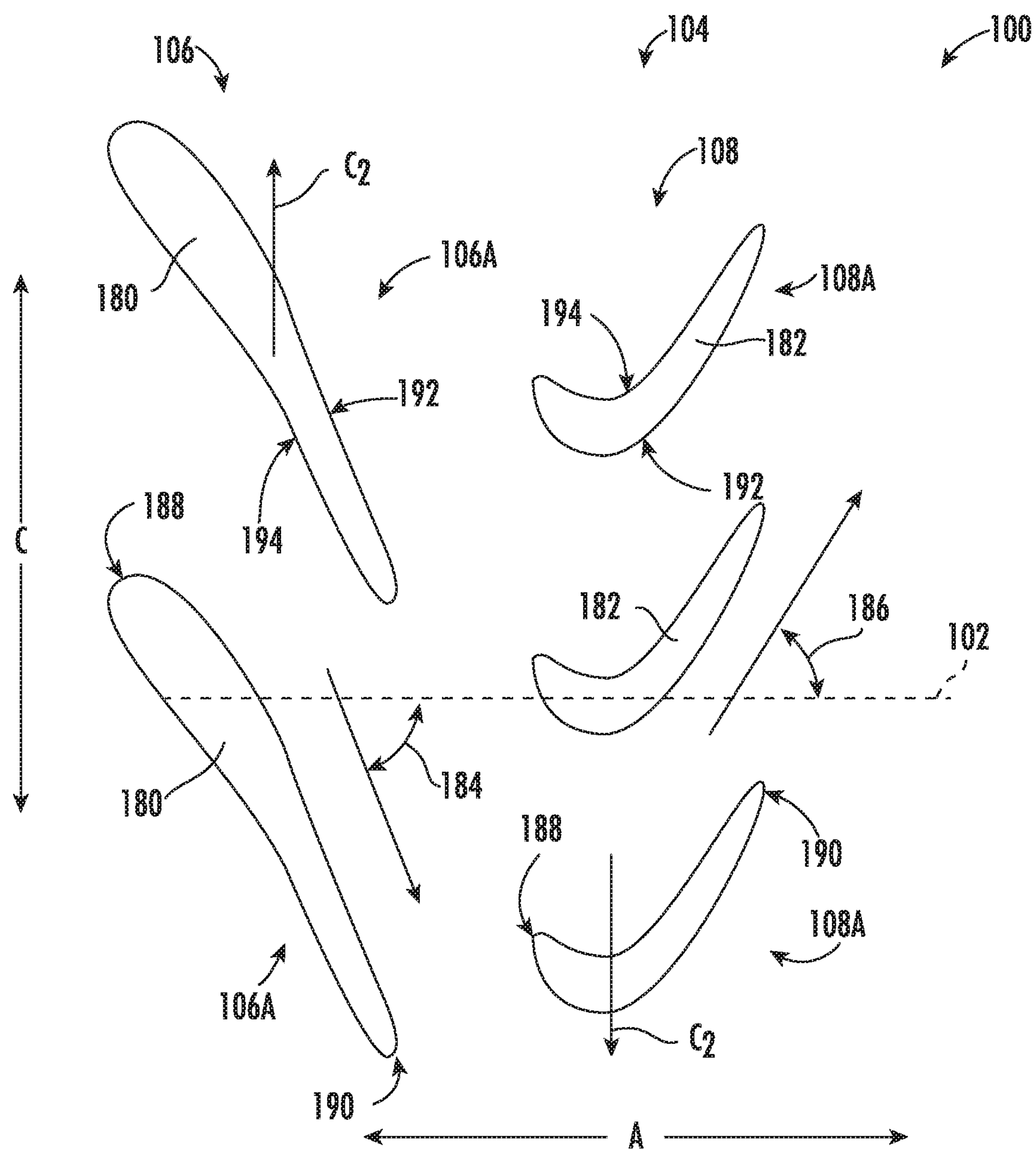
FIG. 3 is cross sectional view depicting exemplary blade pitch angles of a turbine of a turbine section in accordance with an exemplary embodiment of the present disclosure.

Referring now to FIG. 3, an exemplary embodiment of an orientation of the first plurality of turbine rotor blades 106 and the second plurality of turbine rotor blades 108 is generally provided. More specifically, the embodiment of FIG. 3 depicts a first stage of turbine rotor blades 106A of the first plurality of turbine rotor blades 106 and a first stage 108A of a second plurality of turbine rotor blades 108. In at least certain exemplary embodiments, the first plurality of turbine rotor blades may be configured to rotate in a first circumferential direction C1, while the second plurality of turbine rotor blades may be configured to rotate and a second circumferential direction C2.

It will be appreciated that for the embodiment depicted, each of the turbine rotor blades 106A of the first plurality of turbine rotor blades 106 include an airfoil 180, and similarly, each of the turbine rotor blades 108A of the second plurality of turbine rotor blades 108 include an airfoil 182. The airfoils 180 each define an exit angle 184, and similarly the airfoils 182 each define an exit angle 186. The exit angles 184, 186 each represent an angular relationship of a longitudinal centerline 102 (i.e., of the turbomachine within which they are installed) to an exit direction of the gases flowing from an upstream end 188 towards a downstream end 190 of the respective airfoils 180, 182. For the embodiment depicted, the exit angle 184 may be a negative angle, such as a negative acute angle, while the exit angle 186 may be a positive angle, such as a positive acute angle ("positive" and "negative" being used herein to denote a relative value of the respective exit angles 184, 186). Notably, the exit angles 184, 186 of the airfoils 180, 182, respectively, a cause the first plurality of turbine rotor blades 106 and second plurality of turbine rotor blades 108 to rotate in the first and second circumferential directions C1, C2, respectively.

Referring still to FIG. 3, the airfoils 180, 182 may each further include a suction side 192 and a pressure side 194. The suction side 192 of the airfoils 180 are configured as convex toward the first circumferential direction C1 and the pressure side 194 of the airfoils 180 are configured as concave toward the first circumferential direction C1. The suction side 192 of the airfoils 182 are configured as convex toward the second circumferential direction C2 and the pressure side 194 of the airfoils 180 are configured as concave toward the second circumferential direction C2. Such a configuration may further result in the first plurality of turbine rotor blades 106 and second plurality of turbine rotor blades 108 rotating in the first and second circumferential directions C1, C2, respectively.

Referring now back to FIG. 2, it will be appreciated that for the embodiment depicted, the turbomachine further includes an electric machine assembly 200. The electric machine assembly 200 depicted generally includes an electric machine 202 embedded within the turbine section 100, and positioned aft of the turbine 104. In certain exemplary embodiments, the electric machine 202 of the electric machine assembly 200 may be configured in a similar manner to the exemplary electric machine 80 described above with reference to FIG. 1.

As is depicted, the exemplary electric machine assembly 200 further includes a rotary connection member 204 and a stationary connection member 206. The rotary connection member 204 is coupled to the first plurality of turbine rotor blades 106 and the stationary connection member 206 is coupled to a turbine frame, or rather, for the embodiment depicted the turbine rear frame 152. More specifically, for the embodiment depicted, the rotary connection member 204 of the electric machine assembly 200 is coupled, or rather, directly coupled to the first support member 128 of the first support member assembly 126. It will be appreciated, however, that in other exemplary embodiments, the rotary connection member 204 may additionally, or alternatively, be coupled to, e.g., the spool 124, directly to the first plurality of turbine rotor blades 106, to a rotor (not shown) coupled to the first plurality of turbine rotor blades 106, or any other component rotatable directly with the first plurality of turbine rotor blades 106.

Referring still to FIG. 2, the exemplary electric machine 202 of the electric machine assembly 200 generally includes a rotor 208 and a stator 210. The rotary connection member 204 is drivingly coupled to the rotor 208 (i.e., drives, or is driven by, the rotor 208) and the stationary connection member 206 is coupled to the stator 210. In such a manner, the rotor 208 may generally rotate with the first plurality of turbine rotor blades 106 during operation of the turbomachine, while the stator 210 remains substantially stationary relative to the turbine rear frame 152 during operation of the turbomachine. Accordingly, during operation of the turbomachine, the rotor 208 of the electric machine 202 may be driven by the first plurality of turbine rotor blades 106 such that the electric machine 202 of the electric machine assembly 200 generates electrical power. Thus the electric machine 202 is in at least certain exemplary embodiments, configured as an electric generator.

As stated above, in certain exemplary embodiments, the first plurality of turbine rotor blades 106 may be configured as a plurality of low-speed turbine rotor blades, configured to rotate at an absolute rotational speed that is less than an absolute rotational speed at which a second plurality of turbine rotor blades 108 is configured to rotate. Accordingly, for the exemplary embodiment depicted, the electric machine assembly 200 further includes an electric machine gearbox 212. The rotary connection member 204 is drivingly coupled to the rotor 208 of the electric machine 202 through the electric machine gearbox 212. More particularly, for the embodiment depicted, the electric machine gearbox 212 generally includes a first gear coupled to the rotary connection member 204, a second gear coupled to the stationary connection member 206, and a third gear coupled to the rotor 208 of the electric machine 202. It will be appreciated that for the embodiment of FIG. 2, the electric machine gearbox 212 is configured as a planetary gear box. Accordingly, for the embodiment depicted, the first gear is a ring gear 214, the second gear is a planet gear 216 (or, a plurality of planet gears 216), and the third gear is a sun gear 218. Notably, however, in other exemplary embodiments, the electric machine gearbox 212 may have any other suitable configuration. For example, in other exemplary embodiments, the connection of the rotary connection member 204, stationary connection member 206, and rotor 208 to the various gears within the electric machine gearbox 212 may be arranged in the other suitable manner. Additionally, in other exemplary embodiments, the electric machine gearbox 212 may be configured as any other suitable type of gearbox, and further, may be configured as any other suitable speed change mechanism (such as a hydraulic torque converter, an electric machine, a transmission, etc.).

Referring still to the embodiment of FIG. 2, the electric machine gearbox 212 generally defines a gear ratio greater than 1:1 to increase a rotational speed of the rotor 208 of the electric machine 202 relative to the rotary connection member 204. For example, in certain exemplary embodiments, the gear ratio defined by the electric machine 202 may be between about 1.5:1 and about 10:1, such as between about 2:1 and about 8:1, such as between about 2.5:1 and about 6.5:1.

As stated, during at least certain operations of the turbomachine, the electric machine 202 may be configured to generate electrical power (i.e., may be configured as an electric generator). It will be appreciated that for the embodiment depicted, the electric machine 202 is a relatively large electric machine 202 configured to generate a relatively large amount of electrical power during operation. For example, in at least certain exemplary embodiments, the electric machine 202 of the electric machine assembly 200 may be configured to generate at least about one hundred kilowatts of electrical power during operation, such as at least about two hundred kilowatts of electrical power during operation, such as at least about three hundred kilowatts during operation, such as up to about ten megawatts of electrical power during operation. The electrical power generated may be provided through an electric line (not depicted) through the turbine rear frame 152 to any suitable power sink, such as an aircraft power bus to be used by aircraft systems, a power bus of a hybrid-electric propulsion system for an aircraft (e.g., such that the electric machine assembly 200 may drive one or more electric or hybrid electric propulsion devices, such as electric fans), etc.

It will be appreciated, however, that in other exemplary embodiments, the turbine 104 and electric machine assembly 200 may have any other suitable configuration. For example, in other exemplary embodiments, the first plurality of turbine rotor blades 106 and the second plurality of turbine rotor blades 108 may be arranged in any other suitable manner. Similarly, in other exemplary embodiments the first support member assembly 126, the second support member assembly 132, and/or, the center frame support member assembly 154 may each have any other suitable configuration. Moreover, in still other exemplary embodiments, the electric machine assembly 200 may not include the electric machine gearbox 212, and instead, the rotor 208 of the electric machine 202 may be directly rotatable with the rotary connection member 204 (and thus with the first plurality of turbine rotor blades 106). Additionally, in still other exemplary embodiments, the rotary connection member 204 of the electric machine assembly 200 may not be coupled to the support member of the plurality of low-speed turbine rotor blades (i.e., the first support member 128 for the embodiment of FIG. 2), and instead may be coupled to a support member of the plurality of high-speed turbine rotor blades.

Figure 4A:
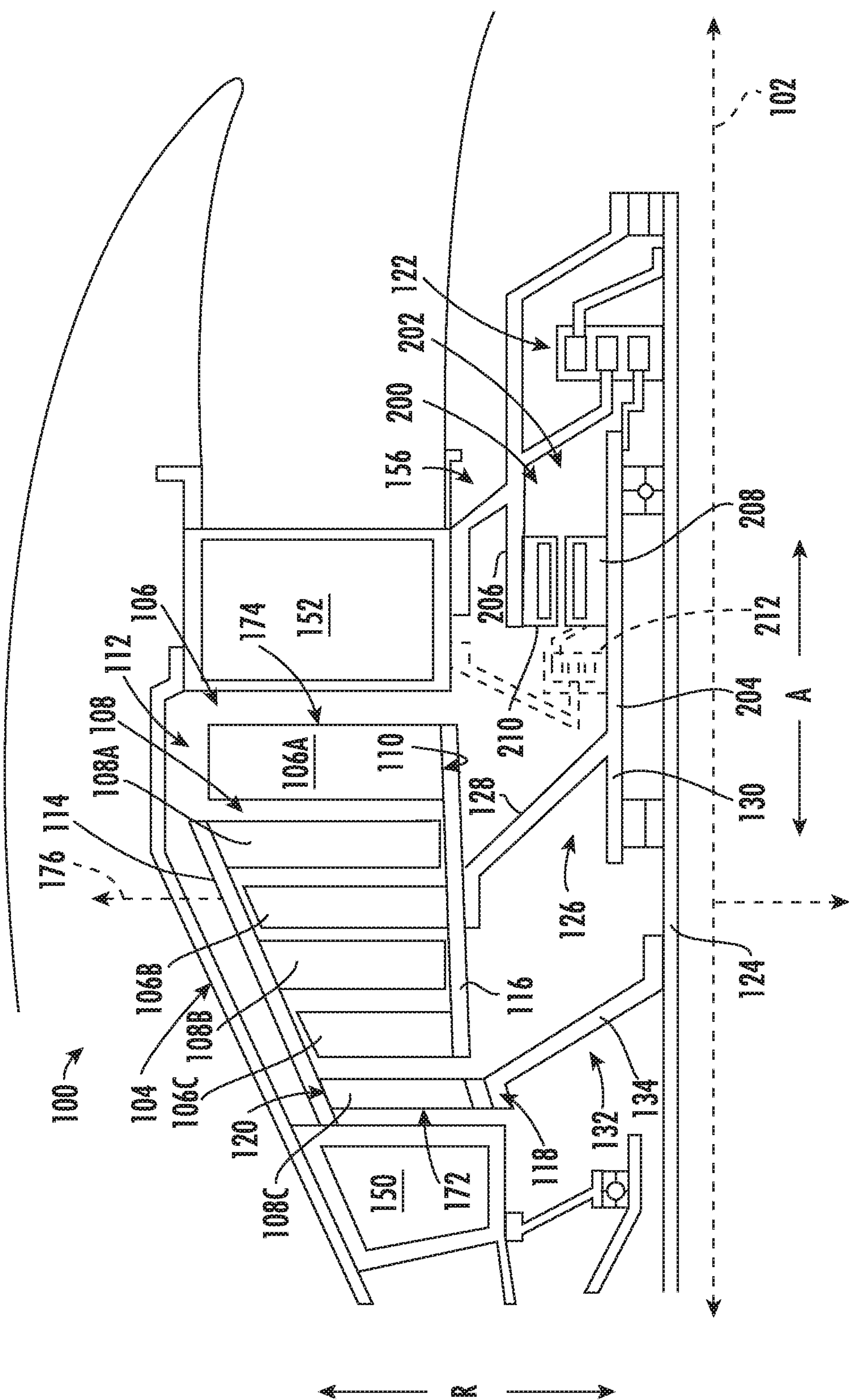
FIG. 4A is a close-up, schematic, cross sectional view of a turbine section in accordance with yet another exemplary aspect of the present disclosure.

For example, referring now to FIG. 4A, a schematic, cross-sectional view is provided of a turbine section 100 including a turbine 104 in accordance with another exemplary embodiment of the present disclosure. The exemplary turbine section 100 of FIG. 4A may be configured in substantially the same manner as exemplary turbine section 100 described above with reference to, and depicted in, FIG. 2. Accordingly, the same or similar numbers refer to the same or similar parts.

As is depicted, the exemplary turbine 104 of the turbine section 100 of FIG. 4A generally includes a first plurality of turbine rotor blades 106 and a second plurality of turbine rotor blades 108. The first plurality of turbine rotor blades 106 are supported by a first support member 128 of a first support member assembly 126, and the second plurality of turbine rotor blades 108 are supported by a second support member 134 of a second support member assembly 132. Additionally, the first plurality of turbine rotor blades 106 are rotatable with the second plurality of turbine rotor blades 108 through a gearbox 122.

Further, for the embodiment depicted, the turbomachine additionally includes an electric machine assembly 200, the electric machine assembly 200 generally including a rotary connection member 204, a stationary connection member 206, and an electric machine 202. The electric machine 202 generally includes a rotor 208 and a stator 210, with the rotary connection member 204 drivingly coupled to the rotor 208 and the stationary connection member 206 coupled to the stator 210. Also for the embodiment of FIG. 4A, the rotary connection member 204 of the electric machine assembly 200 is coupled to, or formed integrally with, the first support member 128 of the first support member assembly 126 and the stationary connection member 206 is coupled to, or formed integrally with, a rear frame support member assembly 156. In such a manner, the rotary connection member 204 is rotatable with the first support member 128 and the first plurality of turbine rotor blades 106, and the stationary connection member 206 is fixedly coupled to the turbine rear frame 152.

However, contrary to the embodiment of FIG. 2, for the embodiment of FIG. 4A, the first plurality of turbine rotor blades 106 is instead configured as a plurality of high-speed turbine rotor blades, and the second plurality of turbine rotor blades 108 is configured as a plurality of low-speed turbine rotor blades. Such is due to the second plurality of turbine rotor blades 108 being directly rotatable with (i.e., rotating with a 1:1 rotational speed ratio) the spool 124 through the second support member 134 of the second support member assembly 132. Accordingly, for the embodiment of FIG. 4A the rotary connection member 204 is configured to rotate with the plurality of high-speed turbine rotor blades (and thus maybe configured to rotate at a higher rotational speed as compared to the embodiment of FIG. 2). Therefore, for the embodiment of FIG. 4A, the electric machine assembly 200 may not need to increase a rotational speed of the rotor 208 of the electric machine 202 relative to the first plurality of turbine rotor blades 106, and thus does not include an electric machine gearbox (such as gearbox 212, described above). Instead the rotary connection member 204 of the electric machine assembly 200 is configured to rotate at the same rotational speed as the plurality of high-speed turbine rotor blades (i.e., the first plurality of turbine rotor blades 106 for the embodiment of FIG. 4A).

It will be appreciated, however, that as is depicted in phantom, in other exemplary embodiments, the electric machine assembly 200 may alternatively include an electric machine gearbox (depicted in phantom as numeral 212), with the rotor 208 of the electric machine 202 being coupled to the rotary connection member 204 through such electric machine gearbox (and not being coupled directly to the rotary connection member 204). For example, it may be desirable based on the design of the electric machine 202 to rotate the rotor 208 at a rotational speed that is greater than a rotational speed of the plurality of high speed turbine rotor blades.

Referring still to FIG. 4A, it will be appreciated that for the embodiment depicted, the coupling of the rotor 208 of the electric machine 202 to the plurality of high speed turbine rotor blades is enabled at least in part by positioning the gearbox 122 aft of the electric machine 202 of the electric machine assembly 200.

Figure 4B:
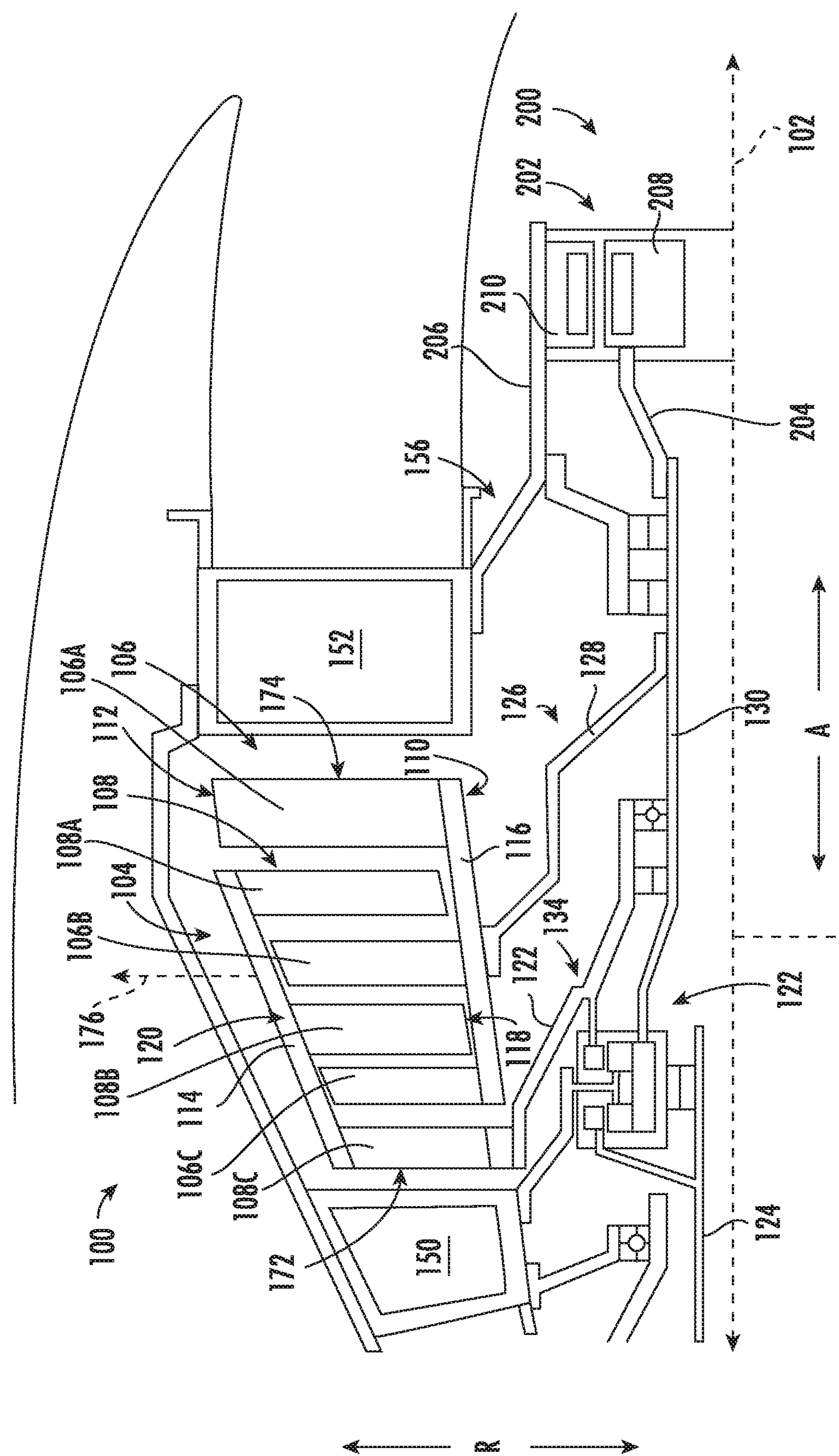
FIG. 4B is a close-up, schematic, cross sectional view of a turbine section in accordance with still another exemplary aspect of the present disclosure.

However, in other exemplary embodiments, the rotor 208 of the electric machine 202 may be coupled to the plurality of high speed turbine rotor blades in any other suitable manner. For example, referring now briefly to FIG. 4B, a schematic, cross-sectional view is provided of a turbine section 100 including a turbine 104 in accordance with another exemplary embodiment of the present disclosure wherein an electric machine 202 is rotatable with a plurality of high speed turbine rotor blades. The embodiment of FIG. 4B is configured in the same manner as the embodiment of FIG. 4A, with the exception that the gearbox 122 is positioned forward of the electric machine 202 of the electric machine assembly 200 and the turbine center frame is providing support for such gearbox 122. Notably, the gearbox 122 is a planetary gearbox including a split ring gear (i.e., a forward ring gear coupled to the shaft 124 and an aft ring gear coupled to the second plurality of turbine rotor blades 108 through a second support member 134 of a second support member assembly 132) and the planet gears are split planet gears (i.e., a forward planet gear coupled to the forward ring gear and an aft planet gear coupled to the aft ring gear). The forward and aft planet gears are fixed though a planet gear carrier to the turbine center frame 150. Additionally, the sun gear is a single sun gear coupled to the forward and aft planet gears and further coupled to the first plurality of turbine rotor blades 106 (i.e., the plurality of high speed turbine rotor blades for the embodiment depicted), through a first support spool 130 and first support member 128 of the first support member assembly 126.

Notably, in still other exemplary embodiments, the electric machine assembly 200 may not include, e.g., the rotary connection member 204, and instead the rotor 208 may be coupled directly to one or more of the support members/support member assemblies.

Further, although described above as an electric generator, in other exemplary embodiments, the electric machine 202 of the electric machine assembly 200 may instead be configured as an electric motor. For example, referring now to FIG. 5, a turbomachine in accordance with another exemplary embodiment of the present disclosure is provided. More specifically, FIG. 5 generally depicts aspects of a propulsion system 220 (e.g., for an aircraft) including a turbomachine in accordance with another exemplary embodiment of the present disclosure. The exemplary turbomachine of FIG. 5 may be configured in substantially the same manner as exemplary turbofan engine 10 described above with reference to FIG. 1. Accordingly, the same or similar numbers generally refer to same or similar parts.

As is depicted, the exemplary turbomachine generally includes a first compressor and a first turbine, each coupled to a first spool, as well as a second compressor and a second turbine, each coupled to a second spool. More specifically, for the embodiment of FIG. 5, the first compressor is a low pressure compressor 22, the first turbine is a low pressure turbine 30, the first spool is a low pressure spool 36, the second compressor is a high pressure compressor 24, the second turbine is a high pressure turbine 28, and the second spool is a high pressure spool 34. Further, for the embodiment depicted, the turbomachine is configured as a turbine turbofan engine 10, and therefore additionally includes a fan 38, with the fan being driven by the low pressure spool 36 across a power gearbox 46.

However, in other exemplary embodiments, the turbomachine may be configured in any other suitable manner. For example, in other embodiments, the turbomachine may additionally include, e.g., an intermediate turbine and an intermediate spool. Additionally, in other embodiments, the turbomachine may not include, e.g., the fan 38 and/or the power gear box 46. Accordingly, in other embodiments, the turbomachine may be configured as any other suitable turbomachine, such as a turboshaft engine, a turbojet engine, a turboprop engine, etc.

Figure 5:
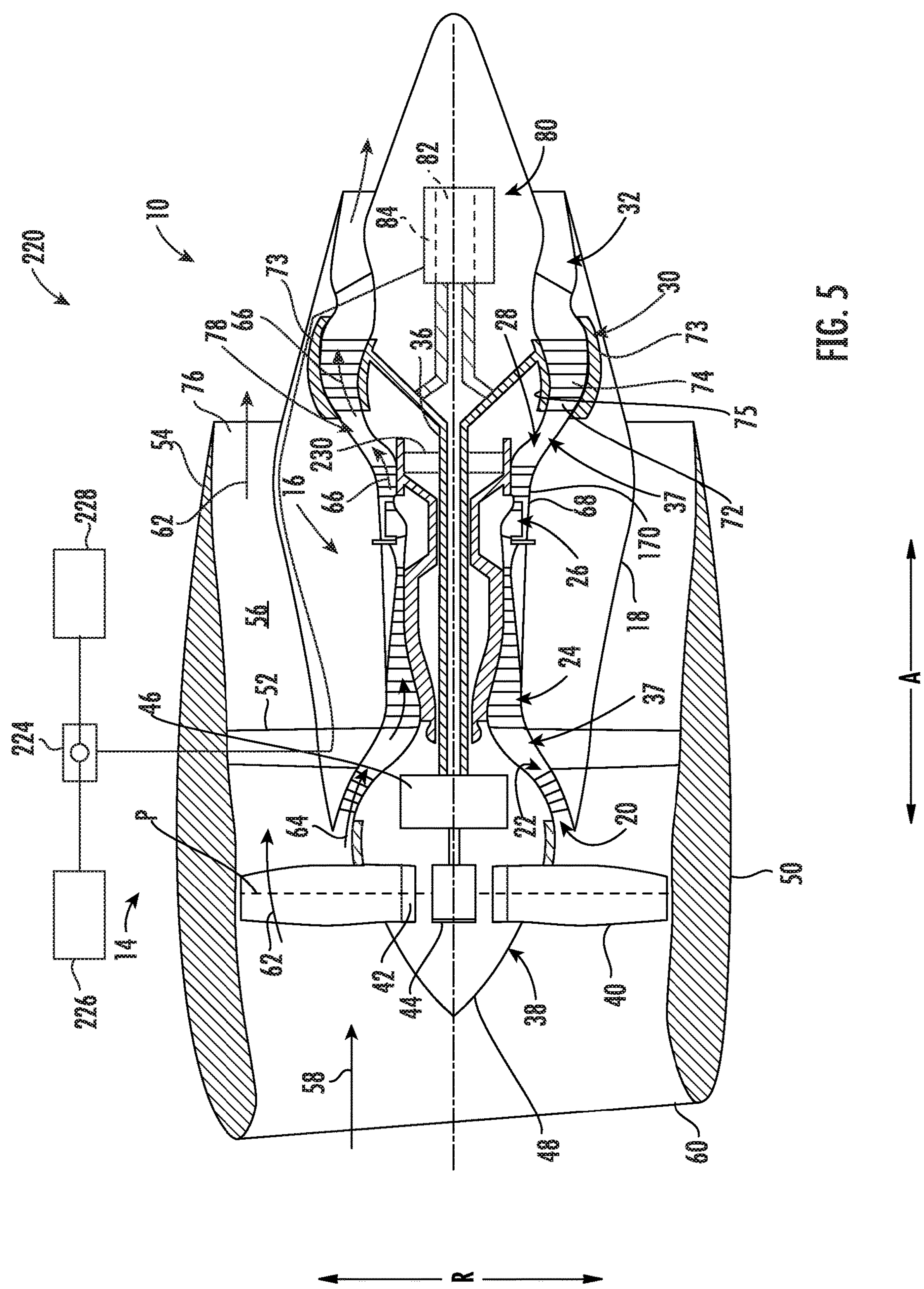
FIG. 5 is a close-up, schematic, cross sectional view of a propulsion system including a turbomachine in accordance with an exemplary aspect of the present disclosure.

Referring still to the embodiment of FIG. 5, the first turbine (i.e., the low pressure turbine 30 for the embodiment depicted) generally includes a first plurality of turbine rotor blades 72 coupled to an outer drum 73, and a second plurality of turbine rotor blades 74 coupled to an inner drum 75. The first plurality of turbine rotor blades 72 and second plurality of turbine rotor blades 74 are alternatingly spaced and rotatable with each other through a gearbox (not shown), and further may counter-rotate. The first plurality of turbine rotor blades 72 may directly rotate with the LP shaft 36 and the first plurality of turbine rotor blades and second plurality of turbine rotor blades made together drive the LP shaft 36.

Further, the exemplary turbomachine of FIG. 5 additionally includes an electric machine 202 rotatable with the LP spool 36 and the first plurality of turbine rotor blades 72. Notably, although the exemplary electric machine 202 is depicted being coupled to the LP spool 36, in other exemplary embodiments, the electric machine 202 may instead be coupled to one or more support members supporting one or more aspects of the turbine (see, e.g., the embodiment of FIG. 2 and the embodiment of FIGS. 4A and 4B).

As noted above, the exemplary turbomachine of FIG. 5 is configured as part of a propulsion system 220. The propulsion system 220 further includes a controller 224, an electric power source 226, and an electric power sink 228. The electric machine 202 is electrically connectable to the electric power source 226 and the electrical power sink 228 through, for the embodiment depicted, the controller 224. In certain exemplary embodiments, the electrical power source 226 may be one or more energy storage units (such as batteries), other electric machines (operating as electric generators), or any other suitable power source. The electric power sink 228 may be, e.g., an electric power bus of an aircraft, one or more energy storage devices (e.g., during charging of such energy storage devices), an electric propulsion device (such as an electric fan), etc. Accordingly, in certain embodiments, the electrical power source 226 and electrical power sink 228 may be the same device operated in a different manner.

During certain operations, the electric machine 202 may be rotated by the LP spool 36, or, by one or more support members within the turbine section 100 (see, e.g., embodiments of FIG. 2 and FIGS. 4A and 4B). During such operations, the electric machine 202 may be operated as an electric generator, such that a rotational power provided to the electric machine 202 is converted to electrical power and provided to the electric power sink 228 (e.g., to drive the one or more electric propulsion devices, or charge one or more batteries). Such may occur generally during idle and/or above idle operating conditions of the turbomachine However, during other operations, the electric machine 202 may receive electric power from the electric power source 226. During such operations, the electric machine 202 may be operated as an electric motor, such that the electric machine 202 converts the electrical power provided thereto to rotational power. In such a manner, the electric machine 202 may rotate the LP spool 36 of the exemplary turbomachine depicted.

With such a configuration, the electric machine 202 may be utilized to start the turbomachine and/or to restart the turbomachine following an unscheduled shutdown of the turbomachine. It will be appreciated, however, that only rotating the LP spool 36 may not be an efficient way to start or restart the turbomachine. Accordingly, the exemplary turbomachine depicted further includes a one-way clutch 230 with the LP spool 36 coupled to the HP spool 34 through the one-way clutch 230. More particularly, for the embodiment of FIG. 5, the one-way clutch 230 is positioned between the LP spool 36 and the HP spool 34. The one-way clutch 230 is configured to allow the LP spool 36 to transfer a torque to the HP spool 34 in a first circumferential direction C1 (see, e.g., FIG. 3), and prevents the HP spool 34 from transferring a torque to the LP spool 36 in the same, first circumferential direction C1 (see, e.g., FIG. 3). For example, in certain exemplary embodiments, the one-way clutch 230 may be configured as a sprag clutch. In such a manner, the HP spool 34 may rotate more quickly than the LP spool 36 during operation of the turbomachine and the LP spool 36 may drive the HP spool 34 during a start, or restart, of the turbomachine.

Such may result in a lighter and more efficient turbomachine, as a separate starting motor may not be necessary to start, or restart, the turbomachine, or alternatively, a smaller dedicated starting motor may be used to start, or restart the turbomachine.

For example, in one exemplary aspect, a turbomachine, such as the exemplary turbomachine depicted in FIG. 5, may be started by initiating a starting sequence. Initiating the starting sequence may include providing electrical power from a power source to an electric machine of an electric machine assembly. The electric machine may convert the received electrical power to a mechanical, rotational power and may drive/rotate an LP spool in a first circumferential direction. Rotating the LP spool in the first circumferential direction during the starting of the turbomachine may include engaging a one-way clutch, such that the LP spool transfers a torque to an HP spool across the one-way clutch. In such a manner, rotating the LP spool in the first circumferential direction during startup of the turbomachine may further include driving the HP spool in the first circumferential direction during the starting of the turbomachine.

The starting sequence may further include determining the HP spool is rotating in the first circumferential direction at least at a minimum rotational speed and, in response, igniting a combustion section. Combustion gases through the combustion section may drive an HP turbine, and in turn the HP spool. The one-way clutch may passively decouple the HP spool from the LP spool as a rotational speed of the HP spool surpasses a rotational speed of the LP spool, allowing the HP spool to rotate at a higher rotational speed in the first circumferential direction than the LP spool, such that the turbomachine may operate as desired.

Part B

Referring now generally to FIGS. 6 through 17, various other exemplary embodiments the present disclosure are depicted and described. The concepts and configurations shown in FIG. 6 through 17, and discussed below, may be integrated into one or more of the exemplary embodiments shown in FIGS. 1 through 5, and described above. Accordingly, although one or more of the embodiments of FIGS. 6 through 17 may not include a counter rotating turbine with alternatingly spaced rotor blades, one or more of the aspects described herewith may be used with one or more of the turbines discussed above with reference to FIGS. 1 through 5.

Figure 6:
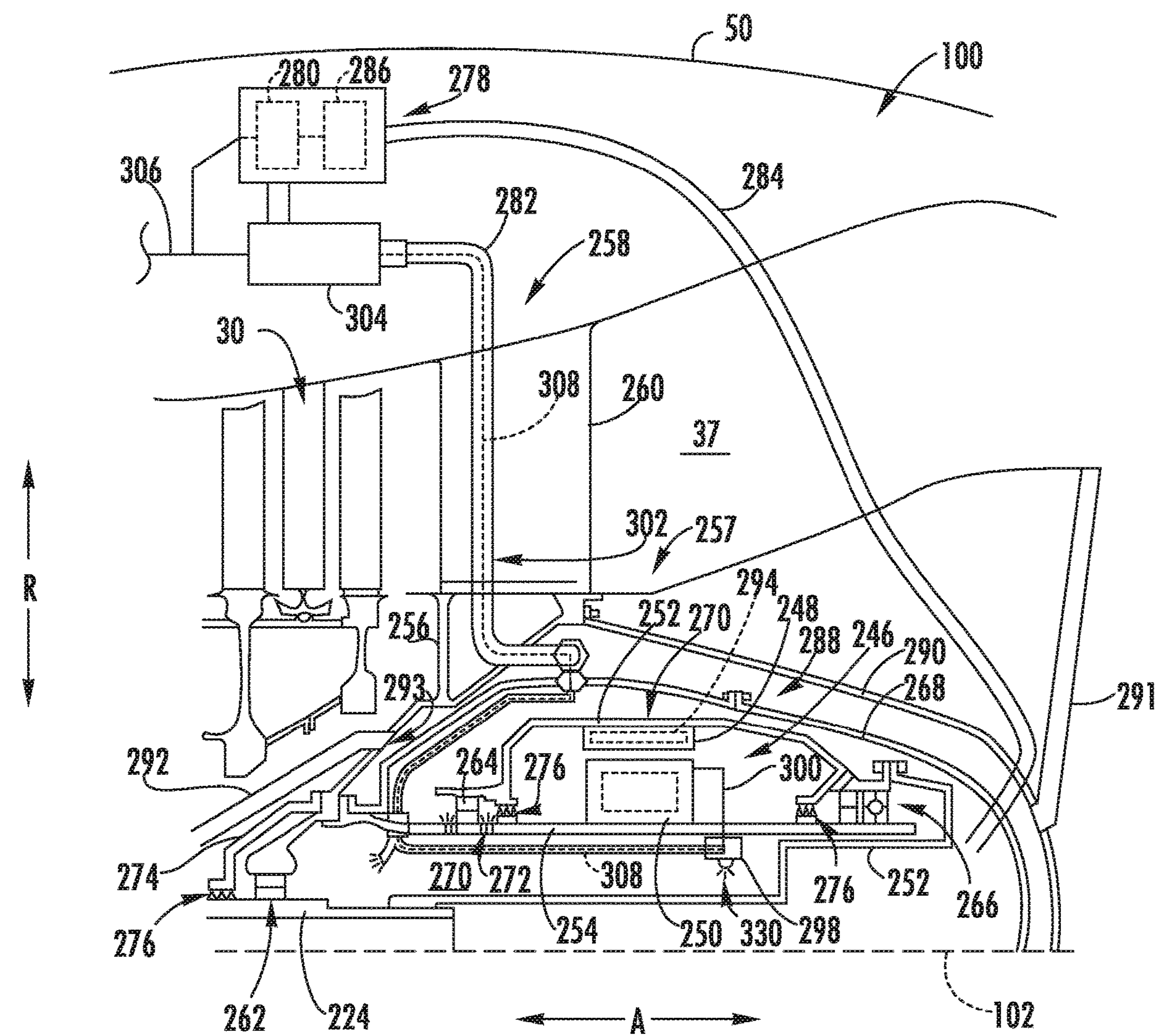
FIG. 6 is a schematic, cross-sectional view of an electric machine embedded in a gas turbine engine in accordance with an exemplary embodiment of the present disclosure.
Figure 7:
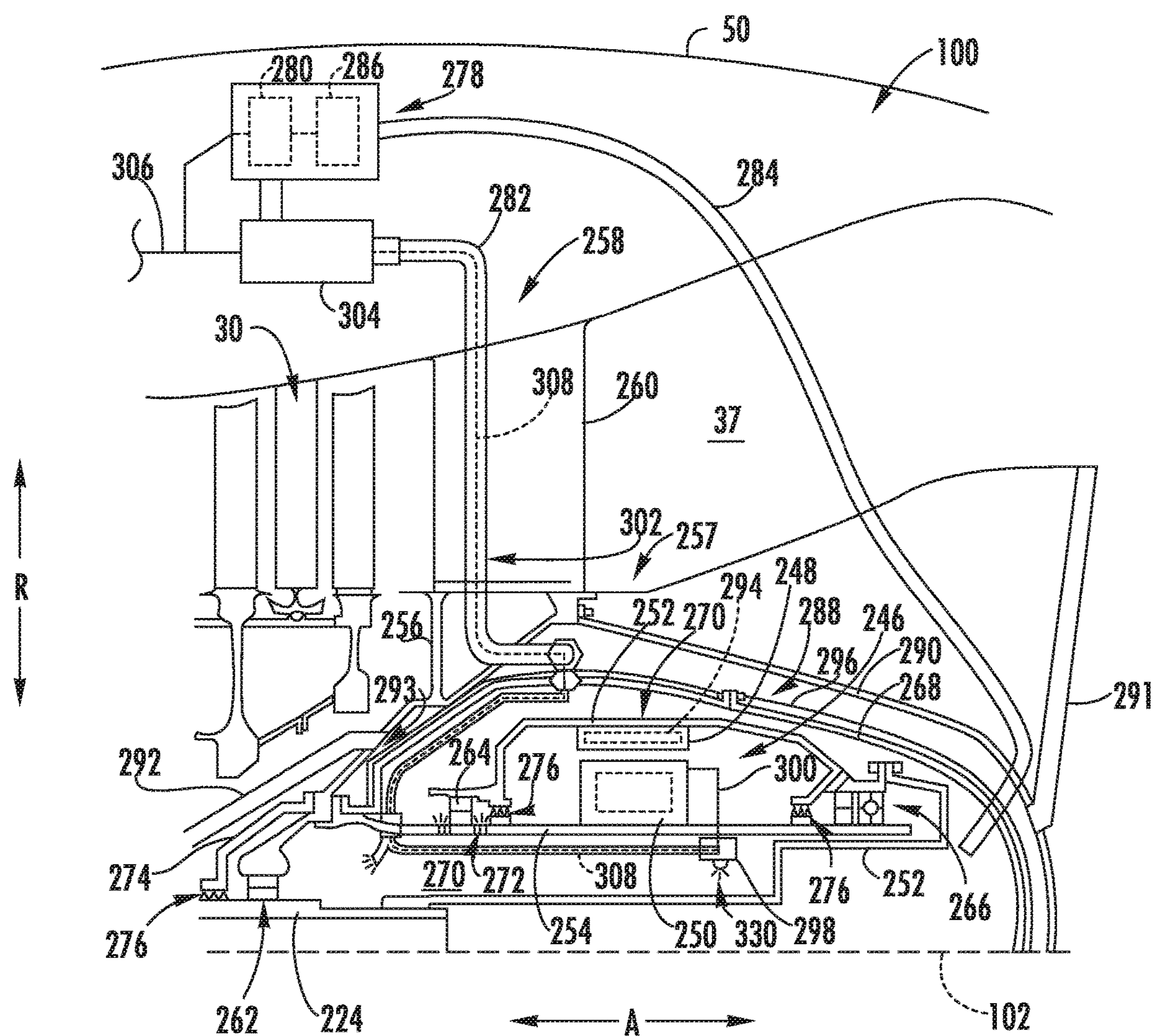
FIG. 7 is a schematic, cross-sectional view of an electric machine embedded in a gas turbine engine in accordance with another exemplary embodiment of the present disclosure.
Figure 8:
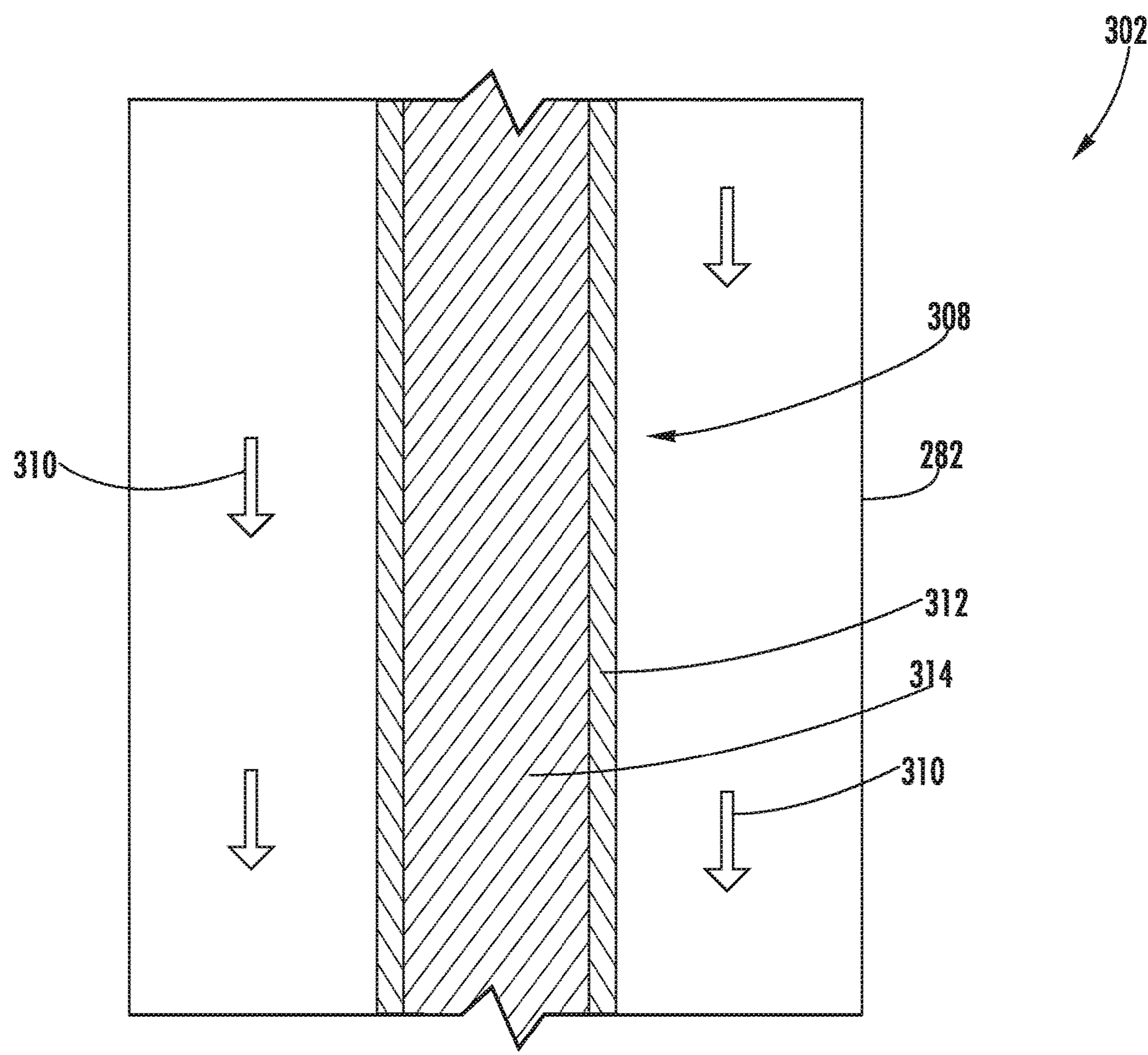
FIG. 8 is a close-up, cross-sectional view of an electric cable positioned within a cooling conduit in accordance with an exemplary embodiment of the present disclosure.

For example, referring now to FIG. 6, an electric machine 246 embedded within a gas turbine engine in accordance with an exemplary embodiment of the present disclosure is depicted. More particularly, for the embodiment depicted, the electric machine 246 is embedded within a turbine section of the gas turbine engine, and more particularly still, is attached to an LP shaft 36 of the gas turbine engine. However, in other embodiments, the electric machine 246 may instead be coupled to, e.g., a first plurality of turbine rotor blades (such as the first plurality of turbine rotor blades 106) of the turbine through, e.g., a first support member (such as the first support member 134, shown in, e.g., FIG. 2). Additionally, the electric machine 246 is positioned at least partially within or aft of the turbine section along an axial direction A. In certain exemplary embodiments, the electric machine 246 and gas turbine engine depicted in FIG. 6 may be configured in substantially the same manner as the exemplary electric machine 202 and turbomachine/turbofan engine 10 described above with reference to FIGS. 1 through 5. Accordingly, the same or similar numbers may refer to the same or similar parts.

As is depicted, the electric machine 246 generally includes a rotor 248 and a stator 250. The rotor 248 is attached via a plurality of rotor connection members 252 directly to the LP shaft 36, such that the rotor 248 is rotatable with the LP shaft 36. By contrast, the stator 250 is attached via one or more stator connection members 254 to a structural support member 256 of the turbine section. In at least certain exemplary embodiments, the electric machine 246 may be an electric generator, such that the rotor 248, and rotor connection members 252, are driven by the LP shaft 36. With such an embodiment, a rotation of the rotor 248 relative to the stator 250 may generate electrical power, which may be transferred via an electric communication bus 258, discussed in greater detail below.

It should be appreciated, however, that in other exemplary embodiments, the electric machine 246 may instead have any other suitable configuration. For example, in other embodiments the electric machine 246 may include the rotor 248 located radially inward of the stator 250 (e.g., as an in-running electric machine).

Referring still to the exemplary electric machine 246 of FIG. 6, the structural support member 256 may be configured as part of an aft frame assembly 257 and extends from an aft frame strut 258 of the aft frame assembly 257 of the gas turbine engine. The aft strut 258 (also referred to as a turbine rear frame) extends through the core air flowpath 37 of the gas turbine engine, and is configured to provide structural support for the gas turbine engine. The structural support member 256 also extends forward to support an aft engine bearing 262—the aft engine bearing 262 rotatably supporting an aft end of the LP shaft 36.

The stator connection member 254 may be an annular/cylindrical member extending from the structural support member 256 of the gas turbine engine. For the embodiment depicted, the stator connection member 254 supports rotation of the plurality of rotor connection members 252 through one or more bearings. More specifically, a forward electric machine bearing 264 is positioned forward of the electric machine 246 and between the rotor connection member 252 and the stator connection member 254 along a radial direction R. Similarly, an aft electric machine bearing 266 is positioned aft of the electric machine 246 and between the rotor connection member 252 and the stator connection member 254 along the radial direction R. Particularly for the embodiment depicted, the forward electric machine bearing 264 is configured as a roller element bearing and the aft electric machine bearing 266 includes a pair of bearings, the pair of bearings configured as a roller element bearing and a ball bearing. It should be appreciated, however, that the forward and aft electric machine bearings 264, 266 may in other embodiments, have any other suitable configuration and the present disclosure is not intended to be limited to the specific configuration depicted, unless such limitations are added to the claims.

The gas turbine engine further includes a cavity wall 268 surrounding at least a portion of the electric machine 246. More specifically, for the embodiment depicted, the cavity wall 268 substantially completely surrounds electric machine 246, extending from a location forward of the electric machine 246 (attached to the structural support member 256, through the stator connection member 254) to a location aft of the electric machine 246. The cavity wall 268 defines at least in part an electric machine sump 270 substantially completely surrounding the electric machine 246. More specifically, the electric machine sump 270 extends from a location forward of the electric machine 246 continuously to a location aft of the electric machine 246. Certain components of the gas turbine engine include openings 272 to allow for such a continuous extension of the electric machine sump 270.

Notably, for the embodiment depicted, the electric machine sump 270 additionally encloses the aft engine bearing 262 of the gas turbine engine. The gas turbine engine includes a sealing arm 274 attached to the structural support member 256 and extending forward of the aft engine bearing 262 to form a seal with the LP shaft 36 and include the aft engine bearing 262 within the electric machine sump 270. Notably, a seal assembly 276 is provided as part of the sealing arm 274 and/or the LP shaft 36 for providing such a seal and maintaining a sealed electric machine sump 270. As is also depicted, the gas turbine engine further includes a plurality of seal assemblies 276 adjacent to the forward electric machine bearing 264 and the aft electric machine bearings 266, for maintaining a sealed electric machine 246, i.e., preventing lubrication oil from reaching the rotor 248 and stator 250 of the electric machine 246.

Moreover, the gas turbine engine depicted includes an electric machine lubrication system 278, with the electric machine lubrication system 278 in fluid communication with the electric machine sump 270, for providing a thermal fluid to the electric machine sump 270. For the embodiment depicted, the electric machine lubrication system 278 may operate independently of a gas turbine engine lubrication system, such as the lubrication system 245 described above with reference to FIG. 3.

Specifically, for the embodiment depicted, the electric machine lubrication system 278 include a supply pump 280 connected to a supply line 282 extending to the electric machine sump 270. The supply line 282 extends from a location outward of the core air flowpath 37 along the radial direction R, through the aft engine strut 258 (and through the core air flowpath 37), through the cavity wall 268 and to the electric machine sump 270. The thermal fluid may be a lubrication oil or other suitable lubricant for lubricating the forward electric machine bearing 264 and the aft electric machine bearings 266, as well as the aft engine bearing 262. Notably, the thermal fluid is further configured to accept heat from the plurality of bearings and the electric machine sump 270. The heated thermal fluid is scavenged out of the electric machine sump 270 via a scavenge line 284 of the lubrication system 278, the scavenge line 284 extending from the electric machine sump 270, through the core air flowpath 37, and to a scavenge pump 286. It should be appreciated, however, that although the scavenge line 284 is, for the embodiment depicted, extending through the core air flowpath 37 at a location outside of the strut 260, in other embodiments, the scavenge line 284 may instead extend through the strut 260 alongside the supply line 282.

Notably, for the embodiment depicted, the electric machine lubrication system 278, including the supply pump 280 and scavenge pump 286, may be powered at least in part by the electric machine 246. Additionally, although not depicted, the electric machine lubrication system 278 may further include one or more heat exchangers for reducing a temperature of the scavenged thermal fluid, before such thermal fluid is provided back through the supply line 282 to the electric machine sump 270.

Notably, with such an embodiment, the lubrication system 278 may further be configured as part of a cooling system of the gas turbine engine for reducing a temperature of the electric machine 246. For example, the inventors of the present disclosure have discovered that for at least certain embodiments, providing lubrication oil to the lubrication oil supply line 282 at a temperature less than about 275° F., such as less than about 250° F., may allow for the lubrication oil to accept an amount of heat necessary to maintain the electric machine 246 within a desired temperature operating range during operation of the gas turbine engine. It should be appreciated, however, that in other embodiments, the lubrication oil provided to the supply line 282 may have any other suitable temperature.

In order to further maintain a temperature of the electric machine 246, the cooling system of exemplary gas turbine engine depicted further includes a buffer cavity 288 surrounding at least a portion of the electric machine 246 to thermally insulate the electric machine 246. More specifically, for the embodiment depicted, the cavity wall 268 also at least partially defines the buffer cavity 288 with the buffer cavity 288 being positioned opposite the cavity wall 268 of the electric machine sump 270. Additionally, as is depicted in FIG. 6, an extension member 290 is attached to or formed integrally with the structural support member 256 and extends at least partially around the cavity wall 268. Specifically, for the embodiment depicted, the structural support member 256 and extension member 290 together extend completely around the cavity wall 268. The structural support member 256 and extension member 290 together define the buffer cavity 288, which for the embodiment depicted extends continuously from a location forward of the electric machine 246 to a location aft of the electric machine 246 along the axial direction A. The buffer cavity 288 may act as an insulator from relatively hot operating temperatures within the core air flowpath 37 extending through the turbine section of the gas turbine engine.

Furthermore, for the embodiment depicted, the gas turbine engine further includes a cooling duct 292. The cooling duct 292 is in airflow communication with the buffer cavity 288 for providing a cooling airflow to the buffer cavity 288. For example, in the embodiment depicted, the cooling duct 292 defines an outlet 293 extending through the structural support member 256 for providing the cooling airflow from the cooling duct 292 through the structural support member 256 and into the buffer cavity 288. The cooling duct 292 may also be in airflow communication with a relatively cool air source for providing the cooling airflow. In certain exemplary embodiments, the cool air source may be a compressor section of the gas turbine engine (wherein the cooling airflow may be diverted from the compressor section), or a fan of the gas turbine engine (wherein the cooling airflow may be diverted from the fan). Notably, for the embodiment depicted, the gas turbine engine further includes an exhaust duct 291. The exhaust duct 291 is in airflow communication with the buffer cavity 288 and is configured to exhaust the cooling airflow to the core air flowpath 37, a bypass passage (e.g., passage 244 of FIG. 3), or an ambient location. Such a configuration may allow for a continuous cooling airflow through the buffer cavity 288.

As discussed, the electric machine lubrication system 278, cooling duct 292, and buffer cavity 288 are each configured as part of the cooling system for maintaining at least certain components of the electric machine 246 within a desired temperature range. For example, for the embodiments wherein the electric machine 246 is configured as an electric generator, the electric generator may be configured as a permanent magnet electric generator including a plurality of permanent magnets 294 (depicted in phantom). For these embodiments, the rotor 248 may include the plurality of permanent magnets 294 and the stator 250 may include one or more coils of electrically conductive wire (not shown). It should be appreciated, however, that in other embodiments, the electric machine 246 may alternatively be configured as an electromagnetic generator, including a plurality of electromagnets and active circuitry, as an induction type electric machine, a switched reluctance type electric machine, as a synchronous AC electric machine, or as any other suitable electric generator or motor.

As will be appreciated, each of the plurality of permanent magnets 294, when included, defines a Curie temperature limit, which may be less than a temperature within the core air flowpath 37 extending through the turbine section of the gas turbine engine. The cooling system of the gas turbine engine maintains a temperature of the electric machine 246, and more particularly each of the permanent magnets 294, below the Curie temperature limit for the plurality of permanent magnets 294. Further, the cooling system may maintain a temperature of the electric machine 246 below a predetermined limit of the Curie temperature limit to, e.g., increase a useful life of the electric machine 246. For example, in certain exemplary embodiments, the cooling system the gas turbine engine may maintain a temperature of the electric machine 246 below at least about a 50 degrees Fahrenheit (° F.) limit of the Curie temperature limit, such as below at least about a 75° F. limit or 100° F. limit of the Curie temperature limit. Maintaining a temperature of the electric machine 246 below such a limit of the Curie temperature limit may further prevent any permanent magnets of the electric machine 246 from experiencing unrecoverable (or permanent) de-magnetization, which may have a negative life impact on the electric machine 246.

It should be appreciated, however, that the exemplary cooling system depicted in the embodiment of FIG. 6 is provided by way of example only. In other embodiments, the gas turbine engine may include any other suitable cooling system. For example, in other embodiments, the electric machine lubrication system 278 may have any other suitable configuration. For example, the electric machine lubrication system 278 may be operable with the engine lubrication system 278. Additionally, in certain embodiments, the cavity wall 268 may have any other suitable features for maintaining a temperature of the electric machine 246 within a desired operating range. For example, referring now briefly to FIG. 7, a cross-sectional, schematic view of an electric machine 246 embedded within a gas turbine engine in accordance with another exemplary embodiment of the present disclosure is depicted. The exemplary gas turbine engine depicted in FIG. 7 may be configured in substantially the same manner as the exemplary gas turbine engine depicted in FIG. 6, and accordingly the same or similar numbers may refer to same or similar part. However, for the embodiment of FIG. 7, the cavity wall 268, which at least partially defines a buffer cavity 288, further includes a layer 296 of insulation to further insulate the electric machine 246 from relatively hot operating temperatures within the core air flowpath 37 extending through the turbine section of the gas turbine engine. The insulation layer 296 may be any suitable insulation for reducing a thermal conductivity of the cavity wall 268 surrounding the electric machine 246. Additionally, although not depicted, in certain embodiments, a portion of the structural support member 256 and extension member 290 (also at least partially defining the buffer cavity 288) may also include a layer of insulation.

Referring again to the embodiment of FIG. 6, as briefly discussed above during operation of the gas turbine engine, the LP shaft 36 may rotate the rotor 248 of the electric machine 246, allowing electric machine 246 to function as an electric generator producing electrical power. Additionally, the electric machine 246 is in electrical communication with—i.e. electrically connected to—the electric communication bus 258. The electric communication bus 258 is electrically connected to the electric machine 246 at a location radially inward of the core air flowpath 37. The electric communication bus 258 includes a first juncture box 298 mounted to the stator connection member 254. The first juncture box 298 receives an electrical line 300 from the electric machine 246 (for the embodiment depicted, from the stator 250 of the electric machine 246) and connects the electric line 300 to an intermediate section 302 of the electric communication bus 258. The intermediate section 302 extends through the core air flowpath 37 to a second juncture box 304 mounted at a location radially outward of the core air flowpath 37, within a cowling of the gas turbine engine. The second juncture box 304 connects the intermediate section 302 of the electric communication bus 258 to an outlet line 306 of the electric communication bus 258 for connection to one or more systems of the gas turbine engine and/or aircraft with which the gas turbine engine is installed. As briefly mentioned above, the electric machine lubrication system 278 may be electrically connected to the outlet line 306 of the electric communication bus 258 for powering the electric machine lubrication system 278.

As stated and depicted in FIG. 6, at least a portion of the electric communication bus 258 extends through the core air flowpath 37. More specifically, for the embodiment depicted, the intermediate section 302 of the electric communication bus 258 extends through the core air flowpath 37 at a location downstream of a combustion section of the gas turbine engine (such as the combustion section 26 of the exemplary turbofan engine 10 of FIG. 1). In particular, the intermediate section 302 extends through/is positioned within the aft strut 258—the aft strut 258 located in a portion of the core air flowpath 37 immediately downstream of the HP turbine 28.

Moreover, as is depicted schematically, the exemplary intermediate section 302 depicted is a cooled portion of the electric communication bus 258, including an electric cable 308 (i.e., an electric conductor) positioned within/extending through a conduit containing a cooling fluid. Specifically, reference will now also be made to FIG. 8, providing a close-up view of a portion of the intermediate section 302 that is configured to extend through the core air flowpath 37 of the gas turbine engine. As is depicted, the intermediate section 302 of the electric communication bus 258 includes the electric cable 308 positioned within and extending coaxially with the supply line 282, such that during operation, the electric cable 308 is surrounded by relatively cool flow of thermal fluid (represented by arrows 310) to be provided, e.g., to the electric machine sump 270. Accordingly, the supply line 282 is considered for the embodiment depicted as part of the electric machine lubrication system 278 as well as part of the intermediate section 302 of the electric communication bus 258. During operation, the thermal fluid surrounding the electric cable 308 within the intermediate section 302 of the electric communication bus 258 may protect the electric cable 308 from relatively high temperatures within the core air flowpath 37, maintaining a temperature of the electric cable 308 within a desired operating range. It should be appreciated, however, that in other embodiments, the intermediate section 302 of the electric communication bus 258 may instead include the electric cable 308 positioned within and extending coaxially with the scavenge line 284 (which may also extend through the strut 260 in certain embodiments).

Notably, the electric cable 308 may be any suitable cable 308, and for the embodiment depicted includes an electrical insulation layer 312 surrounding a conducting core portion 314. The electrical insulation layer 312 may include any suitable electrical insulation capable of being exposed to the relatively high temperatures and further capable of insulating relatively high amounts of electrical power which may be transported through the conducting core portion 314 of the electric cable 308 (see discussion below). Additionally, although not depicted, the electric cable 308 may additionally include a barrier layer surrounding the electric insulation layer 312 and conducting core portion 314 to prevent lubrication oil from contacting the insulation layer 312 and conducting core portion 314. Additionally, still, in certain embodiments, the electric cable 308 may be configured in substantially the same manner as the electric cable 308 described below with reference to FIG. 11.

As will be discussed in greater detail below, the intermediate section 302 of the electric communication bus 258 is configured to transfer relatively high power levels of electrical power. Accordingly, during operation, the intermediate section 302 of the electric communication bus 258 may experience a relatively high amount of Joule heating, or resistive heating, as a result of the relatively high power levels being transferred. Positioning the electric cable 308 of the intermediate section 302 coaxially with the lubrication oil supply line 282 may assist with maintaining a temperature of the electric cable 308 within a desired operating temperature range, despite the resistive heating experienced and exposure to the core air flowpath 37.

It should be appreciated, however, that in other exemplary embodiments, the electric communication bus 258 may have any other suitable configuration for transferring electrical power from the electric machine 246 located radially inward from the core air flowpath 37 to a location radially outward of the core air flowpath 37. For example, referring now briefly to FIG. 9, a cross-sectional, schematic view of an electric machine 246 embedded within a gas turbine engine in accordance with yet another exemplary embodiment of the present disclosure is depicted. The exemplary gas turbine engine depicted in FIG. 9 may be configured in substantially the same manner as exemplary gas turbine engine depicted in FIG. 6, and accordingly the same or similar numbers may refer to same or similar part.

Figure 9:
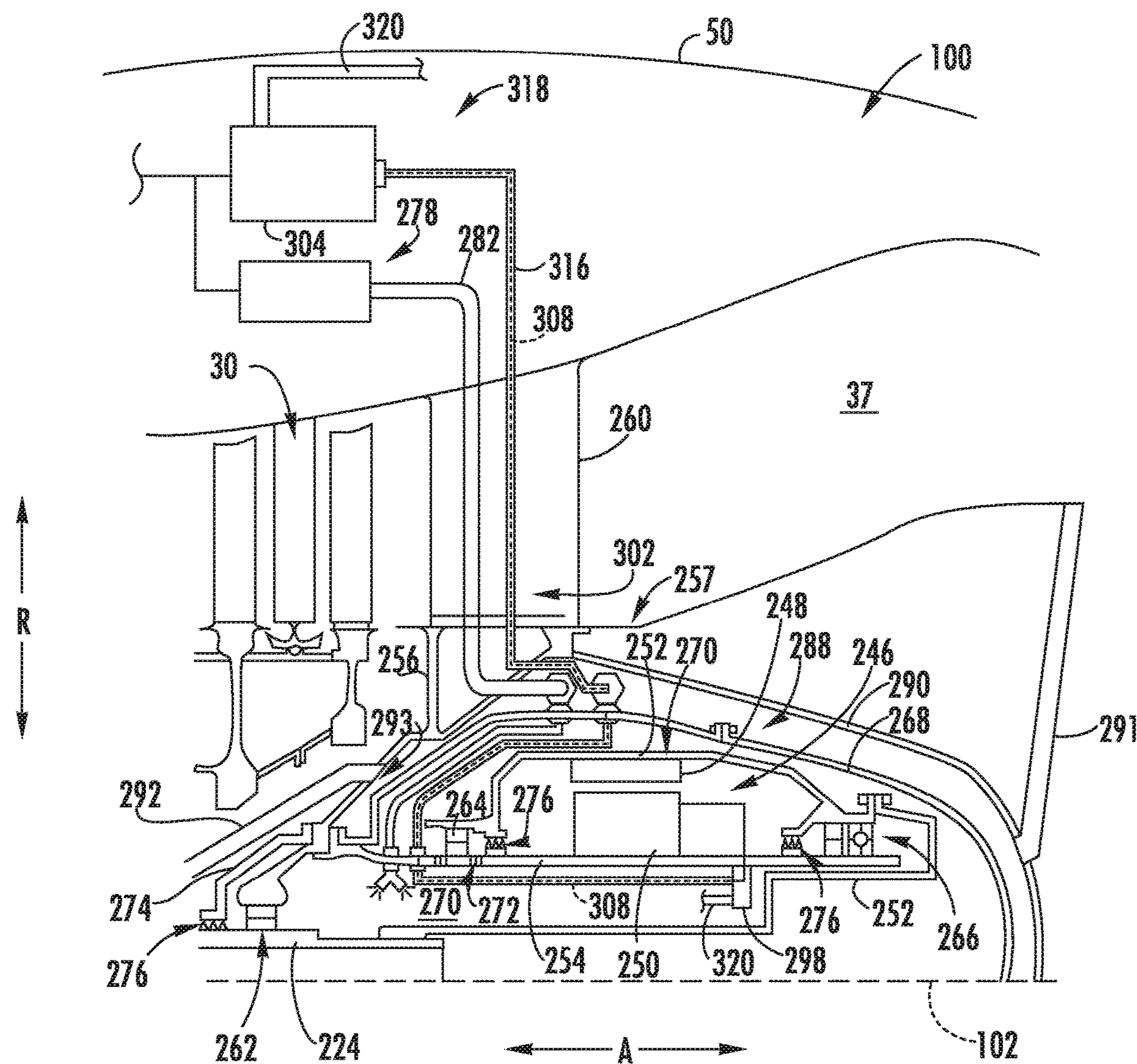
FIG. 9 is a schematic, cross-sectional view of an electric machine embedded in a gas turbine engine in accordance with yet another exemplary embodiment of the present disclosure.

However, for the embodiment of FIG. 9, the electric communication bus 258 is instead configured as a superconducting, or hyper conducting, electric communication bus 258. Accordingly, for the embodiment of FIG. 9, the intermediate section 302 of the electric communication bus 258 may not be configured with the supply line 282 of the electric machine lubrication system 278. Instead, the exemplary electric communication bus 258 includes a separate cooled conduit 316 within which the electric cable 308 is positioned and extends. The electric communication bus 258 includes a refrigerant system 318 for providing a cold refrigerant within the cooled conduit 316 to maintain a temperature of the electric cable 308 extending therethrough at a relatively low temperature. For example, in certain embodiments, the refrigerant system may maintain a temperature of the electric cable 308 at or below a critical temperature of the material forming the electric cable 308, or at least 1° F. cooler than the critical temperature of the material forming the electric cable 308.

Additionally, the cold refrigerant extends to a first juncture box 298, where the refrigerant is separated from the electric line in returned through a return line 320 (partially depicted). For the embodiment depicted, the electric communication bus 258 may additionally include components for operating the refrigeration system 318 in a refrigeration cycle, such as a pump, a condenser, and an expansion valve (not depicted). Notably, in at least certain embodiments, the portion of the intermediate section 302 extending through the core air flowpath 37 may act as an evaporator of the refrigerant cycle.

Although for the embodiment depicted the gas turbine engine includes a separate electric machine lubrication system 278 and refrigerant system 318, in other embodiments the refrigerant utilized by the refrigerant system 318 of the electric communication bus 258 may additionally act as a lubricant for the various bearings within the electric machine 246 (and for the embodiment depicted, for the aft engine bearing 262), such that the refrigerant system 318 and electric machine lubrication system 278 may be configured together as a single system.

Figure 10:
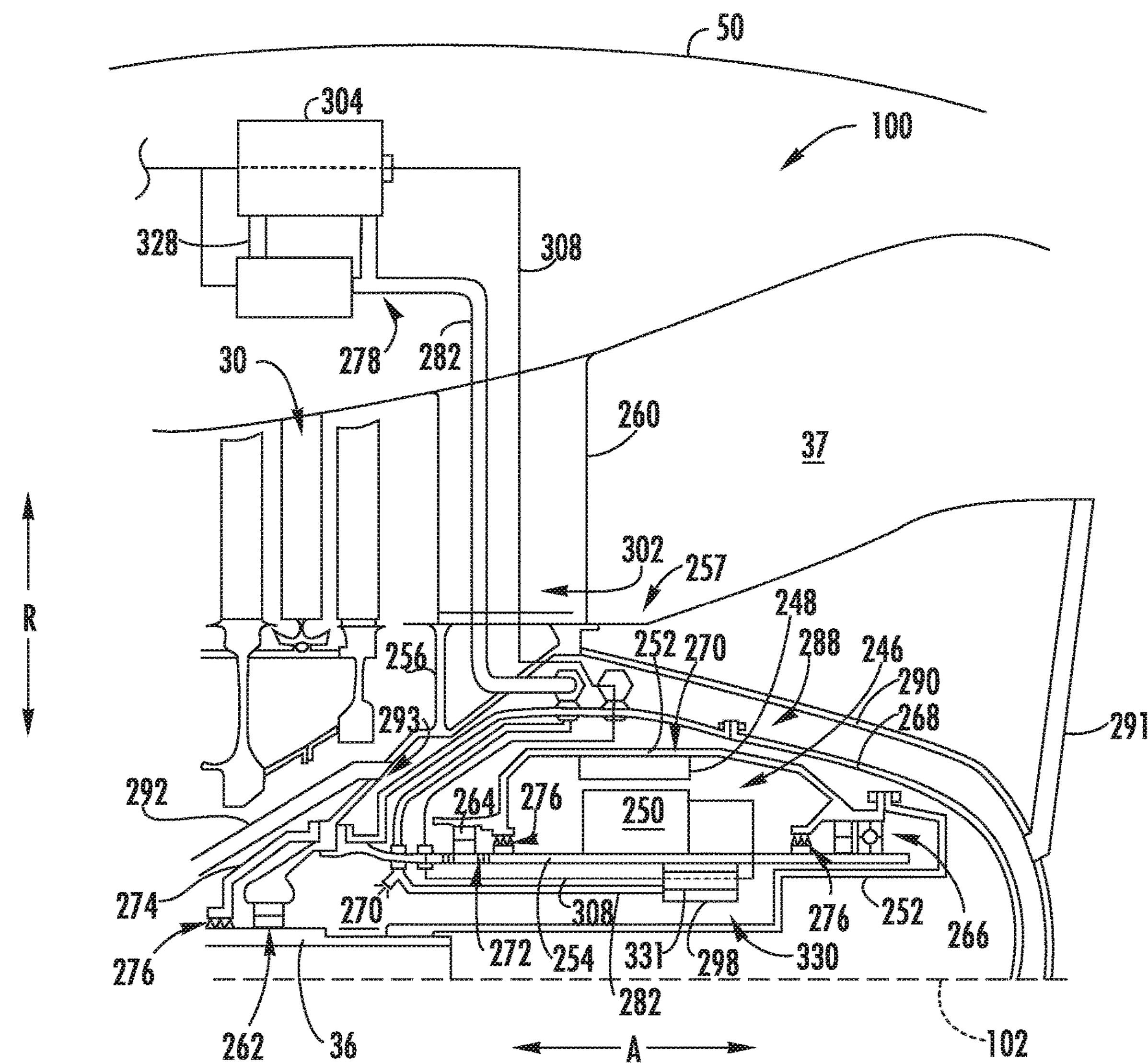
FIG. 10 is a schematic, cross-sectional view of an electric machine embedded in a gas turbine engine in accordance with still another exemplary embodiment of the present disclosure.

Referring now to FIG. 10, a cross-sectional, schematic view of an electric machine 246 embedded within a gas turbine engine in accordance with still another exemplary embodiment of the present disclosure is depicted. The exemplary gas turbine engine depicted in FIG. 10 may be configured in substantially the same manner as exemplary gas turbine engine depicted in FIG. 6, and accordingly the same or similar numbers may refer to same or similar part. However, for the embodiment of FIG. 10, an intermediate section 302 of an electric communication bus 258 is not configured coaxially with a cooling fluid conduit (e.g., a supply line 282). Instead, for the embodiment of FIG. 10, the intermediate section 302 of the electric communication bus

258 is formed of an electric cable 308 designed to withstand the relatively high temperatures of a core air flowpath 37 of the gas turbine engine at a location downstream of a combustion section of the gas turbine engine.

Figure 11:
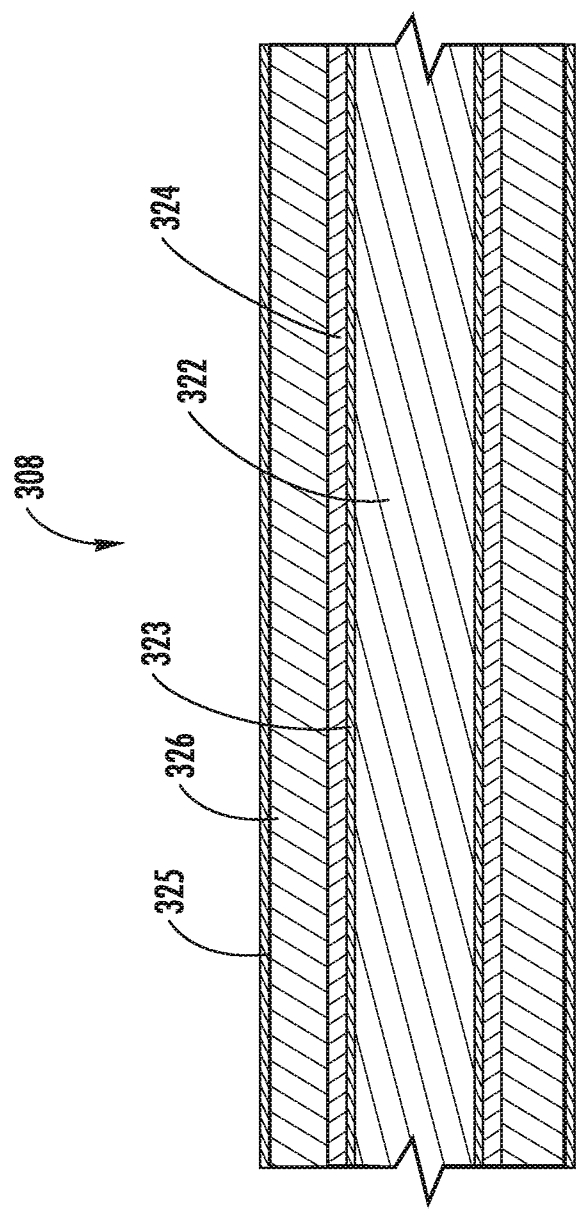
FIG. 11 is a close-up, cross-sectional view of an electric cable in accordance with an exemplary embodiment of the present disclosure.

More specifically, as with the embodiments described above, the electric communication bus 258 includes a first juncture box 298, a second juncture box 304, and the electric cable 308 extending therebetween (i.e., the intermediate section 302). Although the electric cable 308 is depicted as a single cable, in certain embodiments, the electric cable may include a plurality of electric cables. Referring now also briefly to FIG. 11, providing a close-up, schematic view of the electric cable 308, the electric cable 308 is formed of a material capable of transmitting relatively high amounts of electrical power and being exposed to the relatively high temperatures within the core air flowpath 37 without oxidizing.

For example, in certain embodiments, the electric cable 308 may consist of at least one solid nickel wire core. Or, as in the embodiment depicted, the cable 308 may consist of at least one high conductivity core volume, such as a low resistivity/high conductivity cable core 322, and at least one dielectric (electrically-insulating) barrier volume, such as a high resistivity cable jacket 324. The cable core 322 is positioned within the cable jacket 324, such that the cable jacket 324 encloses the cable core 322. In certain exemplary embodiments, the cable core 322 may be a copper core volume and the cable jacket 324 may be a non-copper jacket volume. The cable jacket 324 may be established by one or more encasement processes, such as dipping, co-extrusion, plating, spraying, cladding, swaging, roll-forming, welding, or a combination thereof. The electric cable 308 depicted additionally includes an oxidation barrier volume 323 positioned between the cable core 322 and cable jacket 324. Notably, the cable 308 may be configured as a wire braid, a transposed and compacted wire bundle, transposed bundle(s) of transposed wire bundle(s), or any other suitable cable configuration for transferring alternating current ("AC") power in a manner to reduce AC coupling losses.

Additionally, for the embodiment depicted, the cable core 322 and cable jacket 324 of the electric cable 308 are covered and enclosed within a high temperature electric insulation material 326. For example, in certain embodiments, the high temperature electric insulation material 326 may be a sprayed lamellar barrier coating (ceramic), at least one fractionally-overlapped tape layer (mica, glass fiber, ceramic fiber, and/or polymeric film), external armor barrier (braided, metallic and/or non-metallic), or combinations thereof. The high temperature electric insulation material 326 may be suitable for insulating cables transferring relatively high amounts of electrical power at relatively high temperatures, as discussed below. Further, for the embodiment depicted, the electric cable 308 includes at least one external armor volume 325 as an anti-abrasion barrier, which in certain embodiments may be the same as the insulation material 326.

As is also depicted, the electric machine lubrication system 278 (configured as part of the overall electric machine cooling system) is configured to provide thermal fluid directly to the second juncture box 304 through a connection line 328 for actively cooling the second juncture box 304. Additionally, the thermal fluid supply line 282 of the electric machine lubrication system 278 extends to the first juncture box 298 and provides a flow of thermal fluid directly to the first juncture box 298 for actively cooling the first juncture box 298. Notably, for the embodiment depicted, the first juncture box 298 includes a thermal fluid outlet 330 for ejecting the flow of thermal fluid provided thereto to the electric machine sump 270.

By actively cooling the first juncture box 298 and the second juncture box 304, the intermediate section 302 including the electric cable 308 may be allowed to operate at relatively high temperatures, such as temperatures resulting from exposure to the core air flowpath 37, as well as from Joule heating, or electric resistance heating, of the electric cable 308 during operation of the electric machine 246. A temperature of the electric cable 308 with such a configuration may be reduced at the first juncture box 298 and at the second juncture box 304, allowing for the electric cable 308 to be electrically connected to other electrical lines (e.g., outlet line 306 and electric line 300), which may not be configured for operating at the relatively high temperatures at which the electric cable 308 of the intermediate section 302 is capable of operating.

Moreover, as is also depicted, schematically, further beneficial cooling may be achieved by equipping the second juncture box 304 with an embedded auxiliary fluid flow circuit 331 in heat transfer communication with the fluid transiting connection line 328. The auxiliary fluid within the auxiliary fluid flow circuit 331 may be the same fluid supplied by the fluid supply line 282, or alternatively, may be a distinct thermal transfer fluid. Further, although not depicted, the auxiliary fluid may itself be in subsequent heat transfer communication with a heat-sinking media such as aircraft engine fuel, propulsor fan air, or a motor electronics coolant.

During operation of a gas turbine engine including an electric machine 246 in accordance with an exemplary embodiment of the present disclosure, the electric machine 246 may be configured to generate a relatively high amount of alternating current electric power. For example, in certain embodiments, the electric machine 246 may be configured to generate and deliver through the electric communication bus 258 electrical power at five hundred (500) Volts ("V") or more. For example, in certain embodiments, the electric machine 246 may be configured to generate and deliver through the electric communication bus 258 electrical power at six hundred (600) V or more. Such a configuration may be enabled by the disclosed cooling systems for maintaining a temperature of the electric machine 246 within a certain operating temperature range, and/or by designing the intermediate section 302 of the electric communication bus 258 in a manner allowing it to be exposed to the relatively high temperatures within the core air flowpath 37 downstream of the combustion section of the gas turbine engine.

Figure 12:
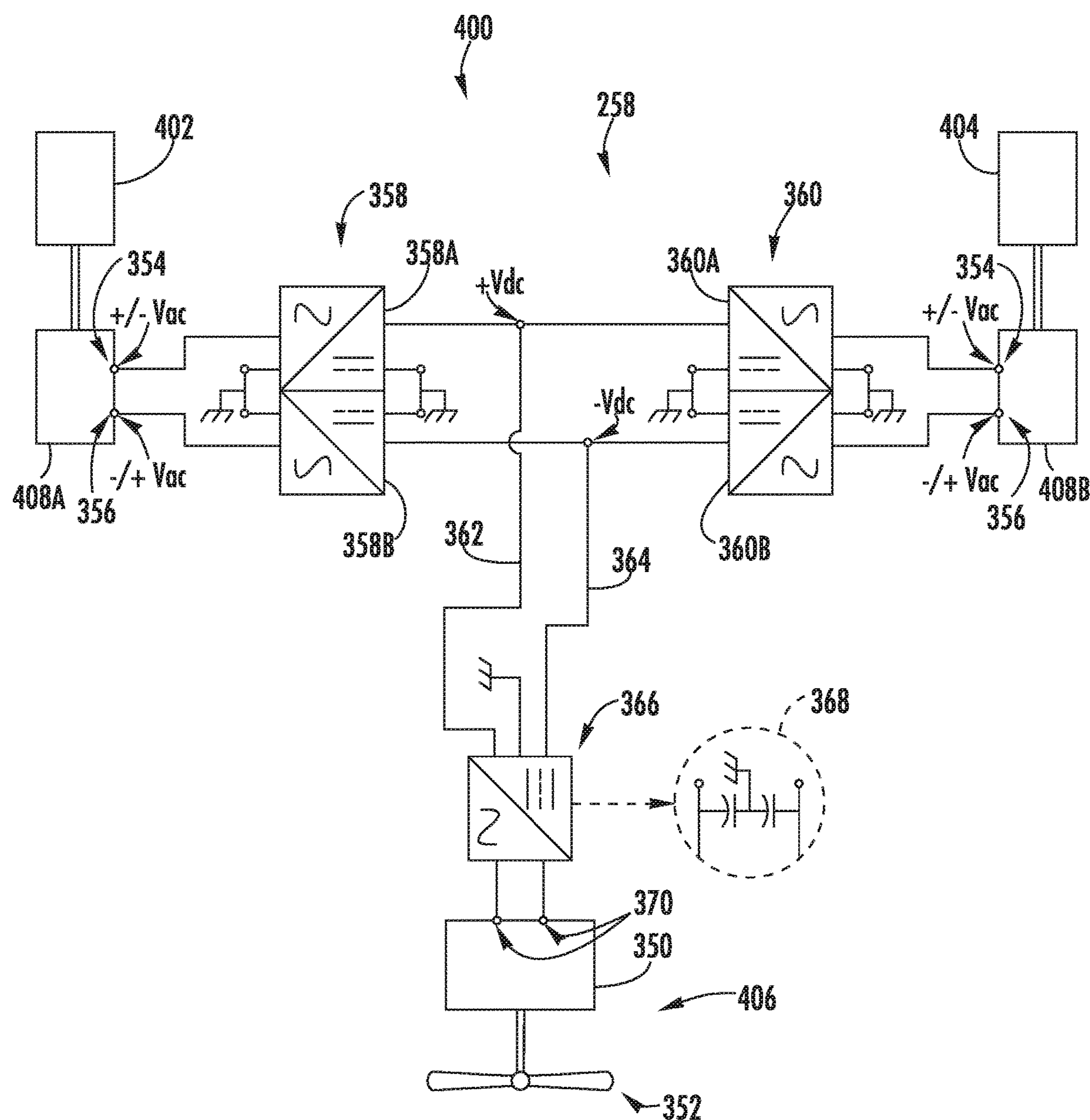
FIG. 12 is a schematic view of a propulsion system in accordance with an exemplary embodiment of the present disclosure.

Additionally, referring now to FIG. 12, a schematic view of an exemplary propulsion system 400 for an aircraft is provided. It will be appreciated that the symbols depicted in FIG. 12 (as well as FIGS. 13 through 17) may have the ordinary meaning attached thereto in the art. As is depicted schematically, and discussed above, the propulsion system 400 includes at least one gas turbine engine, which for the embodiment depicted is configured as a first engine 402, and a first electric machine 408A coupled to an electric communication bus 258. The first engine 402 and first electric machine 408A are configured for generating a baseline voltage level during operation. The propulsion system 400 additionally includes an electric propulsor, which in certain embodiments may be a boundary layer ingestion (BLI) fan 406 depicted (the BLI fan 406 including an electric motor 350 powering a fan 352). Furthermore, the exemplary propulsion system 400 depicted includes a means for providing a differential voltage to the electric propulsor equal to about twice a baseline voltage magnitude generated by the first electric machine 408A.

More specifically, for the embodiment depicted, the means for providing a differential voltage to the electric propulsor equal to about twice the baseline voltage magnitude includes a second gas turbine engine and a second electric machine 408B, in combination with the electric communication bus 258. More specifically, the means for providing a differential voltage to the electric propulsor equal to about twice the baseline voltage magnitude includes a second engine 404 and second electric machine 408B, in combination with the electric communication bus 258. Moreover, each of the first and second engines 402, 404 and respective electric machines 408 may be configured in substantially the same manner as one or more of the gas turbine engines and embedded electric machines 246 described above with reference to FIGS. 6 through 10.

Broadly speaking, for the embodiment depicted, the first and second electric machines 408A, 408B are configured to generate alternating current ("AC") voltage at a baseline voltage level. The electric communication bus 258 is configured to convert the AC voltage to a positive direct current ("DC") voltage and a negative DC voltage, each having the substantially the same magnitude as the baseline voltage level, but at different polarities. The electric communication bus 258 then converts the two DC voltages of equal magnitude (and opposite polarity) back to an AC voltage having a net differential value about twice the magnitude of the baseline voltage level and provides such differential AC voltage to the electric propulsor/electric motor 350 of the BLI fan 406.

Specifically, for the exemplary embodiment depicted, the first electric machine 408A may be an N-phase generator having first and second terminations 354, 356 generating a first voltage at the baseline voltage level. The first voltage level may be an AC voltage Vac. Similarly, the second electric machine 408B may be an N-phase generator having first and second terminations 354, 356 generating a second voltage also at the baseline voltage level. Accordingly, the second voltage level may also be an AC voltage Vac. For example, in certain embodiments, the first and/or second electric machine 408A, 408B may be configured in substantially the same manner as one or more of the electric machines 408 described below with reference to FIGS. 13 through 15.

Further, the electric communication bus 258 includes at least one AC-to-DC converter. Specifically for the embodiment depicted, the electric communication bus 258 includes a first N-phase AC-to-DC converter 358 electrically connected to the first electric machine 408A and a second N-phase AC-to-DC converter 360 electrically connected to the second electric machine 408B. The first converter 358 and second converter 360 together convert the voltages Vac generated by the first and second electric machines 408A, 408B to a positive DC voltage +Vdc and a separate, negative DC voltage −Vdc. Notably, each of the first and second converters 258, 260 are chassis-grounded, as denoted schematically. Further, the first converter 258 includes a first module 358A configured to convert the voltage Vac from the first termination 354 of the first electric machine 408A to a positive DC voltage +Vdc, in addition to a second module 358B configured to convert the voltage Vac from the second termination 356 of the first electric machine 408A to a negative DC voltage −Vdc. Similarly, the second converter 360 includes a first module 360A configured to convert the voltage Vac from the first termination 354 of the second electric machine 408B to a positive DC voltage +Vdc, in addition to a second module 360B configured to convert the voltage Vac from the second termination 356 of the second electric machine 408B to a negative DC voltage −Vdc.

Furthermore, the electric communication bus 258 includes a positive DC transmission line 362 and a negative DC transmission line 364. The positive and negative DC transmission lines 362, 364 are subsequently converted to an AC voltage using a separate, N-phase DC-to-AC converter 366. The specifics of the exemplary converter 366 are shown schematically and simplified in the call-out bubble 368 depicted in FIG. 12, and may be generally referred to as an H-bridge, pulse width modulated voltage converter. The converter 366 is also electrically connected to the terminations 370 of the electric motor 350 of the BLI fan 406.

In at least certain embodiments, the electric propulsion device may require (or desire) a net differential voltage greater than the magnitude of the baseline voltage level, which may be greater than a magnitude that any one transmission line of the electric communication bus 258 may safely transport. Accordingly, the configuration shown schematically in FIG. 12 may allow for the electric communication bus 258 to provide the electric motor 350 with a differential AC voltage Vdiff that is double in magnitude of the first and second voltages, Vac (i.e., $Vdiff=(+Vac)-(-Vac)=2\times|Vac|$).

Figure 13:
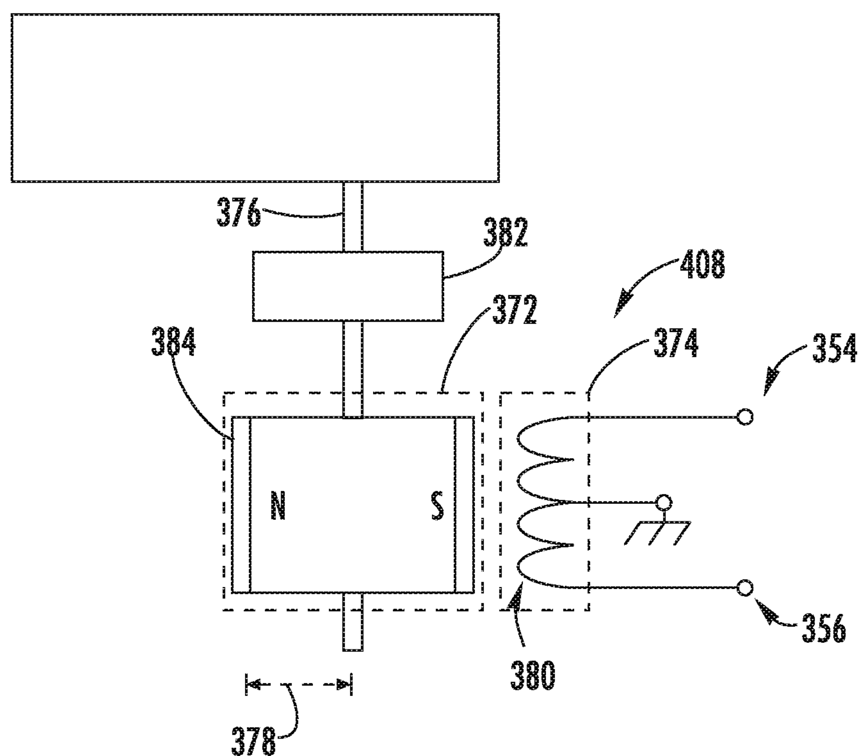
FIG. 13 is a schematic view of an electric machine in accordance with an exemplary embodiment of the present disclosure.
Figure 14:
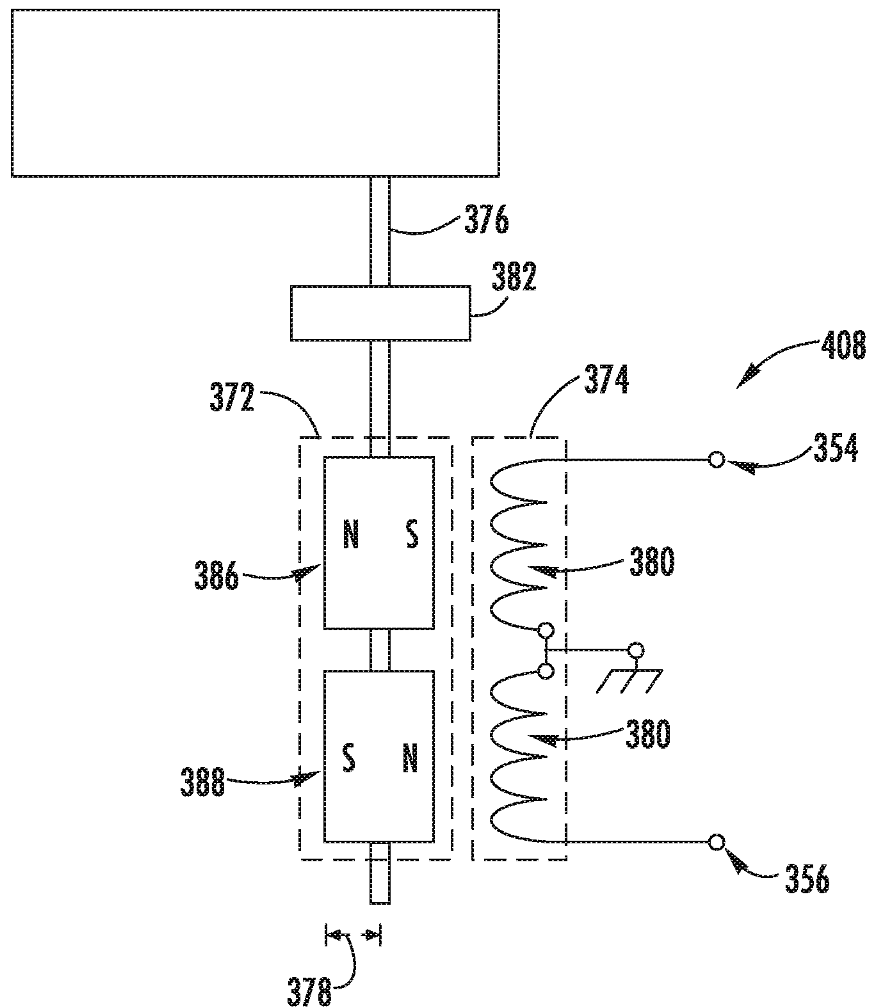
FIG. 14 is a schematic view of an electric machine in accordance with another exemplary embodiment of the present disclosure.
Figure 15:
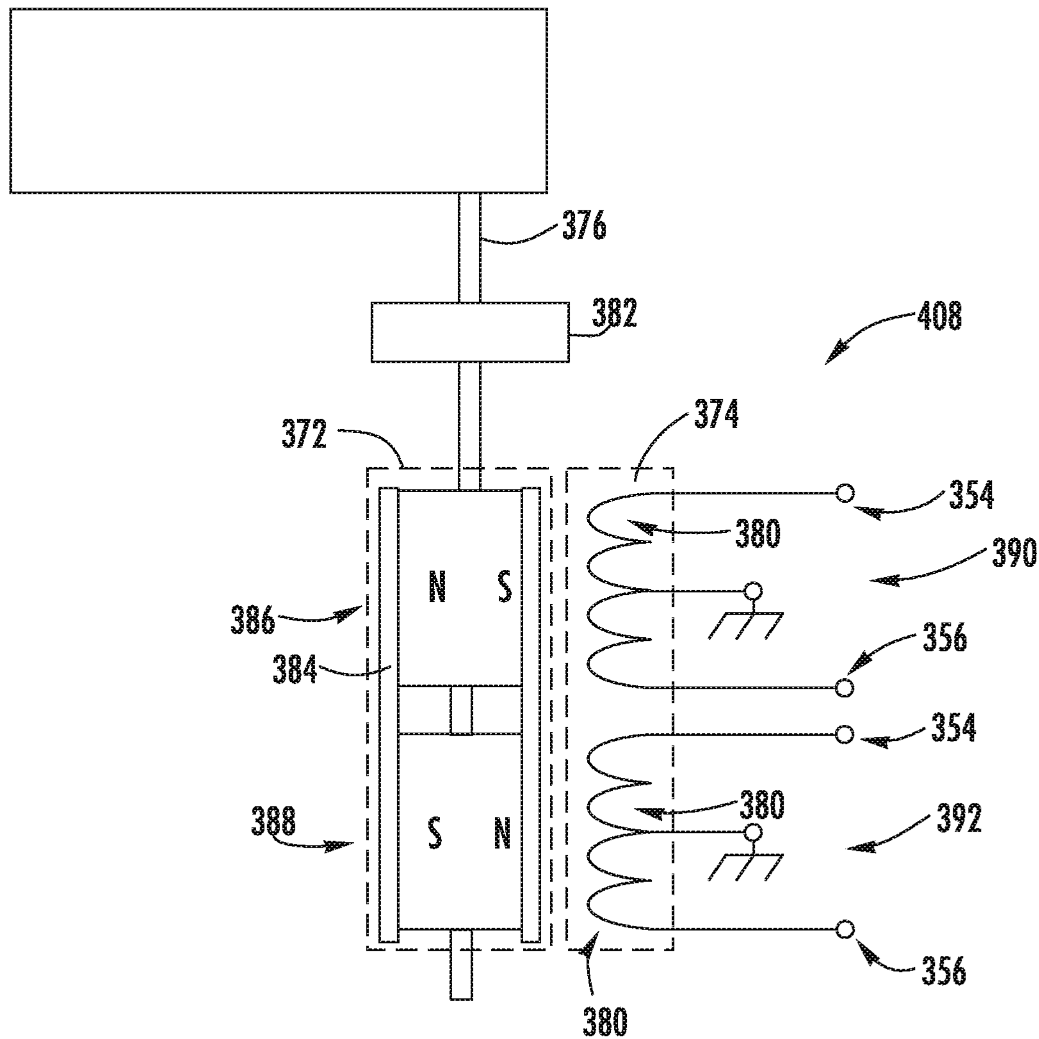
FIG. 15 is a schematic view of an electric machine in accordance with yet another exemplary embodiment of the present disclosure.

For example, referring now briefly to FIGS. 13 through 15, various electric machines 408 in accordance with various exemplary embodiments of the present disclosure are provided. In certain embodiments, one or both of the first and second electric machines 408A, 408B may be configured in substantially the same manner as one or more of the exemplary electric machines 408 depicted in FIGS. 13 through 15. Additionally, in certain exemplary embodiments, the electric machines 408 depicted in FIGS. 13 through 15 may be embedded electric machines (similar to the electric machines described above).

Referring first to the exemplary embodiment of FIG. 13, the electric generator 408 may be an N-phase generator having first and second terminations 354, 356. It should be appreciated, that as used herein, the term "N-phase" is used to denote the ability for the component to include any suitable number of phases. Accordingly, although for the embodiment depicted the electric machine 408 may be a two phase electric generator, in other embodiments, the electric machine 408 may instead be a single phase electric generator, a three-phase electric generator, a four-phase electric generator, etc. The electric machine 408 generally includes a rotor 372 and a stator 374. The rotor 372 is rotatable by an engine (e.g., the first or second engine 402, 404) through a shaft 376. As will be appreciated, a voltage generated by the electric machine 408 is a function of a rotational speed, Ω, of the rotor 372, a radius 378 of the rotor 372, a number of turns or windings 380 in the stator 374, etc. For the electric machine 408 of FIG. 13, the stator 374 is center-tapped to ground (i.e., a center of the turns 380 of the stator 374 is grounded to chassis), such that the electric machine 408 may provide positive and negative voltage, each at the voltage level+/−Vac. Notably, however, in order to do so, given that a number of the turns 380 of the stator 374 has been effectively reduced by half, the rotor 372 may need to be rotated at twice the rotational speed, Ω. Moreover, as is depicted schematically, a power gearbox 382 may be provided between the motor and the electric machine 408 for increasing a rotational speed of the rotor 372 relative to the motor. In order to support the increased rotational speed, Ω, the exemplary rotor 372 depicted includes an over band, or support band 384 to provide support thereto. Notably, the support band 384 may be configured as part of a rotor support member 252 when the electric machine 408 is configured in the same manner as the exemplary electric machine 246 of FIG. 6. Additionally, it should be appreciated, that in certain embodiments, the support band 384 may be necessary without the inclusion of a power gearbox 382.

Referring now to FIG. 14, an electric machine 408 in accordance with another exemplary embodiment is depicted. The exemplary electric machine 408 of FIG. 14 may be configured in substantially the same manner as the exemplary electric machine 408 described above with reference to FIG. 13. For example, the electric machine 408 of FIG. 14 generally includes a rotor 372 and a stator 374, with the rotor 372 being rotatable by an engine through a shaft 376. However, for the embodiment of FIG. 14, the rotor 372 is instead configured as a tandem rotor having a first rotor section 386 and a second rotor section 388 arranged along an axis of the shaft 376. Note that although the first and second rotor sections 386, 388 are depicted spaced apart and connected through a separate shaft 376, in certain embodiments, the first and second rotor sections 386, 388 may instead be positioned adjacent to one another and attached or connected directly to one another.

As is indicated schematically, a magnetic pole clocking of the first rotor section 386 lags a magnetic pole clocking of the second rotor section 388. Specifically, for the embodiment depicted the first rotor section 386 is one hundred and eighty degrees out of phase with the second rotor section 388. Additionally, the stator 374 has double the turns 380 of the stator 374 of the electric machine of FIG. 13, but is similarly grounded at the center to the chassis (i.e., a center-tapped to ground electric machine). Further, for the embodiment depicted, the rotor 372, or more specifically, the first and second rotor sections 386, 388 of the rotor 372, each define a radius 378 that is approximately half of the radius 378 of the exemplary rotor 372 of FIG. 13. Accordingly, as will be appreciated, the rotor 372 of the exemplary electric machine 408 of FIG. 14 may be rotated at the same rotational speed as the rotor 372 of the exemplary first electric machine 408 depicted in FIG. 13. Notably, however, as the radius 378 of the rotor 372 of the electric machine of FIG. 14 is approximate half of the radius 378 of the rotor 372 of the first electric machine of FIG. 13, the rotor 372 may not need an over band, or support band 384, to support the rotor 372 during operation.

With each of the electric machines 408 described above with reference to FIGS. 13 and 14, the first and second terminations 354, 356 of the electric machines 408 may each provide AC voltage varying from positive Vac to negative Vac, due to the center-tapped to ground configuration. Accordingly, in simplest forms, the means for providing a differential voltage to the electric propulsor equal to about twice a baseline voltage magnitude may be the electric machine 408 being a center-tapped to ground electric machine.

Moreover, still, referring now to FIG. 15, another exemplary embodiment of the present disclosure is provided. FIG. 15 provides a schematic view of an electric machine 408 in accordance with another exemplary embodiment of the present disclosure. The exemplary electric machine 408 of FIG. 15 may be configured in substantially the same manner as the exemplary electric machine 408 described above with reference to FIG. 14. For example, the electric machine 408 of FIG. 15 generally includes a rotor 372 and a stator 374, with the rotor 372 being rotatable by an engine through a shaft 376. Additionally, the rotor 372 is configured as a tandem rotor having a first rotor section 386 and a second rotor section 388. As is indicated schematically, a magnetic pole clocking of the first rotor section 386 also lags a magnetic pole clocking of the second rotor section 388. The stator 374 includes essentially the same number of turns 380 as the exemplary stator 374 of FIG. 14. However, instead of being grounded at a center, the stator 374 is instead divided at the center between a first stator section 390 positioned adjacent to the first rotor section 386 and a second stator section 392 positioned adjacent to the second rotor section 388. Further, the first stator section 390 is center-tapped to ground and the second stator section 392 is also center-tapped to ground. Accordingly, the first stator section 390 includes a respective first set of terminals 354, 356 and the second stator section 392 includes a second set of terminals 354, 356. Given the reduction to a number of turns 380 of each of the stator sections 390, 392, in order to generate a similar voltage as the exemplary electric machines 408 of FIGS. 13 and 14, the rotor 372 must rotate at a rotational speed, Ω, twice that of the exemplary rotor 372 of the exemplary electric machines 408 of FIGS. 13 and 14. Again, as is depicted schematically, a power gearbox 382 may be provided between the motor and the electric machine 408 for increasing a rotational speed, Ω, of the rotor 372 relative to the motor. Accordingly, despite a relatively low radius 378 of the exemplary rotor 372 in FIG. 15, given the increased rotational speed, Ω, it may be necessary for the exemplary rotor 372 to include an over band, or support band 384, as is depicted schematically in FIG. 15, for supporting the exemplary rotor 372 of FIG. 15.

Notably, the exemplary electric machine of FIG. 15 may be utilized as a single electric machine for generating a desired voltage for the electric propulsion device. Specifically, the first terminations 354, 356 of the first stator section 390 electric machine of FIG. 15 may be configured as the first and second terminations 354, 356 of the exemplary first electric machine 408A in FIG. 12 and the second terminations 354, 356 of the second stator section 392 of the electric machine of FIG. 15 may be configured as the first and second terminations 354, 356 of the exemplary second electric machine 408B in FIG. 12. Alternatively, the exemplary electric machine of FIG. 15 may be simply configured as a two-phase electric machine, with the first set of terminations 354, 356 being the first phase and the second set of terminations 354, 356 being the second phase.

Additionally, it should be appreciated that in other exemplary embodiments, the electric machines may be designed in any suitable manner to perform as described herein. For example, in other embodiments, the rotors 372 may define any suitable radius 378 or length, the stators 374 may include any suitable number of turns 380, and the rotors 372 may be rotated at any suitable speed, Ω, to generate a desired voltage.

Figure 16:
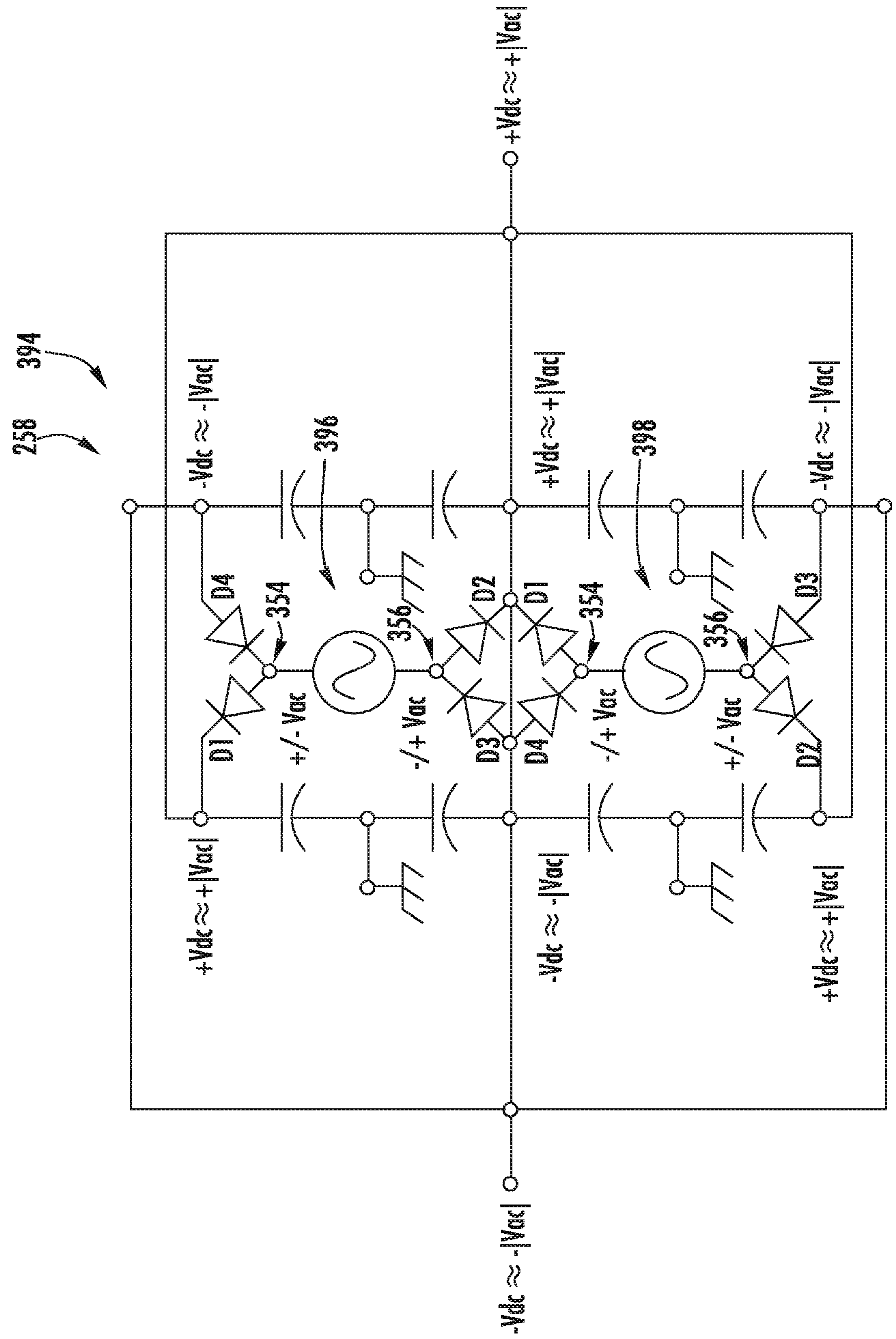
FIG. 16 is a schematic view of an AC-to-DC voltage converter in accordance with an exemplary embodiment of the present disclosure.
Figure 17:
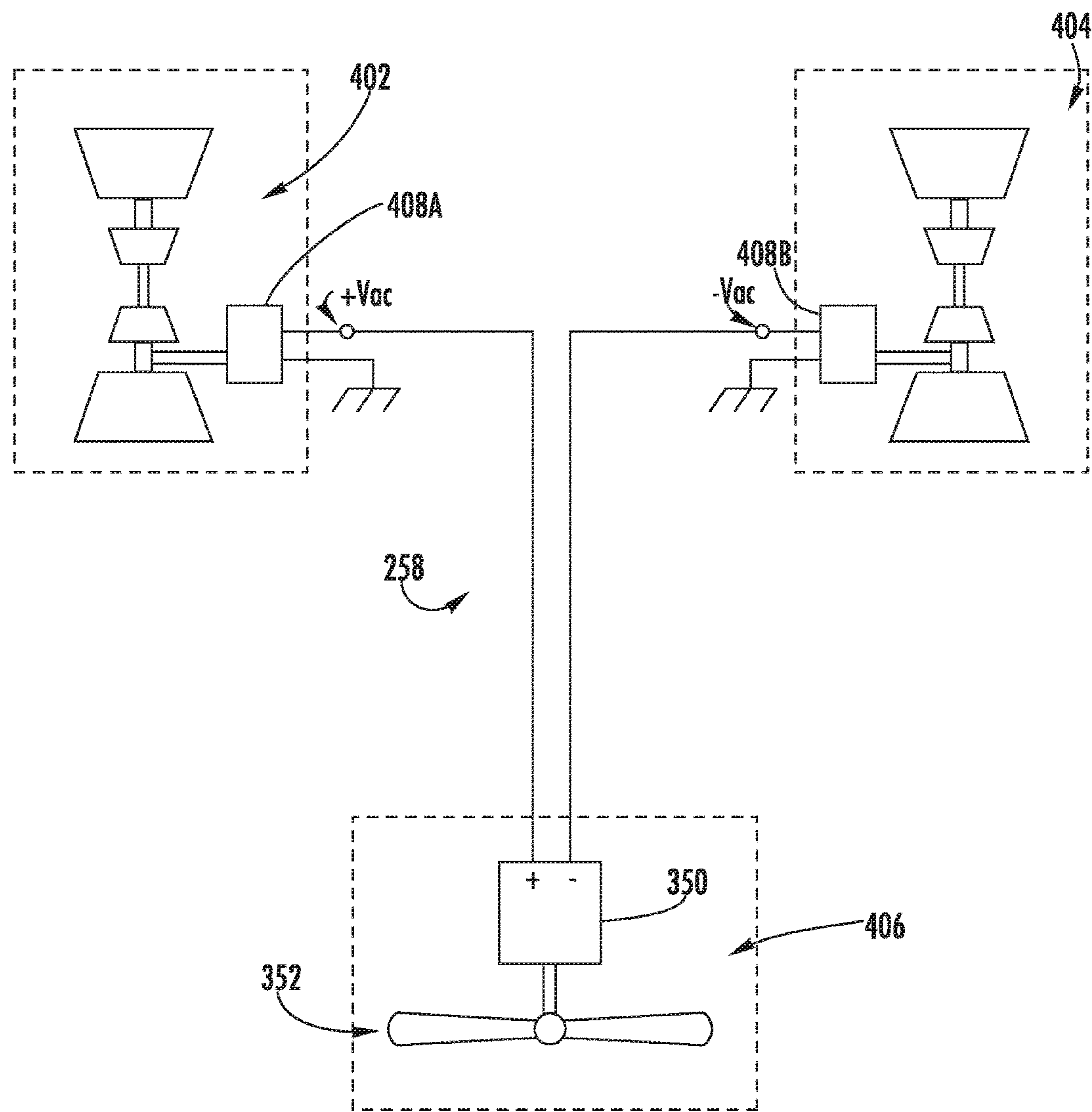
FIG. 17 is a schematic view of a propulsion system in accordance with another exemplary embodiment of the present disclosure.

Referring now to FIG. 16, an electric communication bus 258 including an N-phase AC-to-DC converter 394 is depicted schematically in accordance with another exemplary embodiment of the present disclosure. In at least certain exemplary embodiments, the converter 394 of the exemplary electric communication bus 258 of FIG. 16 may effectively combine both of the first and second converters 358, 360 described above with reference to FIG. 12.

More specifically, the exemplary AC-to-DC converter 394 of FIG. 16 is configured as a two-phase AC-to-DC converter. However, it will be appreciated, that in other embodiments, the features of the exemplary converter 394 depicted may be extrapolated out to accommodate any other suitable number of phases, such that the converter 394 may be utilized with one or more generators (such as first and second electric machines 408A, 408B of FIG. 12) having any suitable number of phases.

Referring specifically to FIG. 16, the exemplary two-phase AC-to-DC converter 394 is electrically connected to a first phase 396 of a permanent magnet generator and is also electrically connected to a second phase 398 of a permanent magnet generator, each including first and second terminations 354, 356. In certain exemplary embodiments, the first phase 396 of permanent magnet generator may be a first electric generator (such as one or more of the electric machines 408A depicted in FIGS. 13 through 15) and the second phase 398 of permanent magnet generator may be a second electric generator (such as one or more of the electric machine 408 depicted in FIGS. 13 through 15). Additionally, or alternatively, in still other embodiments, the first phase 396 of electric generator may be generated by the first rotor section 386 and first stator section 390 of the exemplary electric machine of FIG. 15 and the second phase 398 of electric generator may be generated by the second rotor section 388 and second stator section 392 of the exemplary electric machine of FIG. 15.

Accordingly, it should be appreciated that the means for providing a differential voltage to the electric propulsor equal to about twice the baseline voltage magnitude may be inclusion of a multi-phase, center-tapped AC electric generator in combination with a multi-phase AC-to-DC converter configured to convert the AC voltage generated into a positive DC voltage and a negative DC voltage. With such an embodiment, the means may further include a DC to AC converter depending on the type of electric motor provided with the electric propulsor.

It should also be appreciated that in other exemplary embodiments, the means for providing a differential voltage to the electric propulsor equal to about twice the baseline voltage magnitude may be inclusion of two N-phase AC generators, each coupled to an N-phase AC-to-DC converter configured to convert the AC voltages from the respective generators into a combined positive DC voltage and a combined negative DC voltage. Again, with such an embodiment, the means may further include a DC to AC converter depending on the type of electric motor provided with the electric propulsor Furthermore, it should be appreciated that in still other embodiments, the electric machines 408 may not be AC electric generators, and instead may be DC electric generators. For example, referring now to FIG. 17, a schematic view of a propulsion system 400 in accordance with another exemplary embodiment is provided. As is depicted schematically, the propulsion system 400 includes at least one gas turbine engine, which for the embodiment depicted is configured as a first engine 402, and a first electric machine 408A coupled to an electric communication bus 258. The first engine 402 and first electric machine 408A are configured for generating a baseline voltage level during operation. The propulsion system 400 additionally includes an electric propulsor, which in certain embodiments may be the exemplary BLI fan 406 depicted (the BLI fan 406 including an electric motor 350 powering a fan 352). Furthermore, the exemplary propulsion system 400 depicted includes a means for providing a differential voltage to the electric propulsor equal to about twice a baseline voltage magnitude generated by the first electric machine 408A.

More specifically, for the embodiment depicted, the means for providing a differential voltage to the electric propulsor equal to about twice the baseline voltage magnitude includes a second gas turbine engine and a second electric machine 408B, in combination with the electric communication bus 258. More specifically, the means for providing a differential voltage to the electric propulsor equal to about twice the baseline voltage magnitude includes a second engine 404 and second electric machine 408B, in combination with the electric communication bus 258. The first and second engines 402, 404 and first and second electric machines 408A, 408B are each configured as DC electric generators. The first electric machine 408A is configured to generate a positive DC voltage, Vdc, and the second electric machine 408B is configured to generate a negative DC voltage, −Vdc. The voltages Vdc, −Vdc from the first and second electric machines 408A, 408B are combined to provide the motor 350 of the electric propulsion device a differential voltage, Vdiff, equal to about twice the baseline voltage magnitude generated by the first electric machine 408A (i.e., $V_{diff}=(+V_{dc})-(-V_{dc})=2\times|V_{dc}|$).

Part C

Referring now generally to FIGS. 18 through 23, various other exemplary embodiments the present disclosure are depicted and described. The concepts and configurations shown in FIGS. 18 through 23, and discussed below, may be integrated into one or more of the exemplary embodiments shown in FIGS. 1 through 5, and described above. Accordingly, although one or more of the embodiments of FIGS. 18 through 23 may not include a counter-rotating turbine with alternatingly spaced rotor blades, one or more of the aspects described herewith may be used with one or more of the turbines discussed above with reference to FIGS. 1 through 5. It will be appreciated that repeat use of reference numerals in this Part C from Part B refer to different components previously referred to in Part B.

Figure 18:
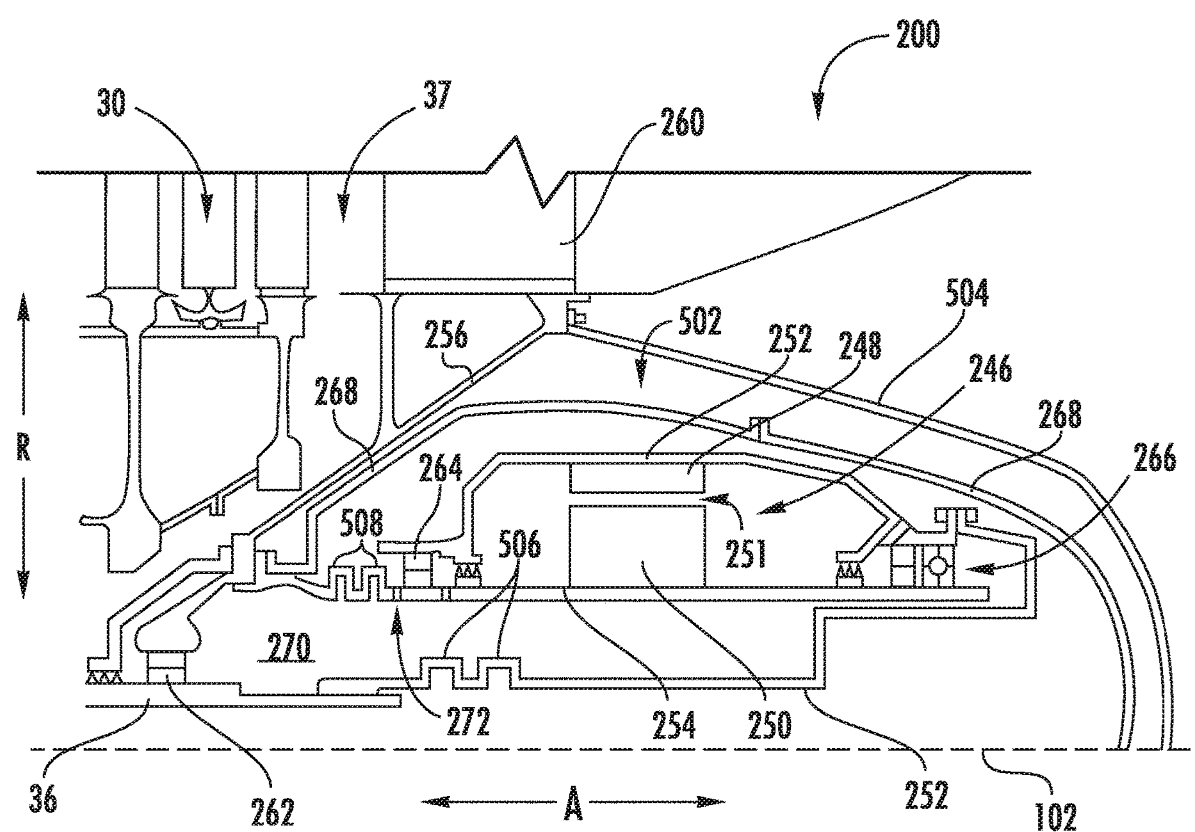
FIG. 18 is a schematic, cross-sectional view of an electric machine embedded in a gas turbine engine in accordance with an exemplary embodiment of the present disclosure.

For example, referring now to FIG. 18, an electric machine 246 embedded within a gas turbine engine in accordance with an exemplary embodiment of the present disclosure is depicted. More particularly, for the embodiment depicted, the electric machine 246 is embedded within a turbine section of the gas turbine engine, and more particularly still, is attached to an LP shaft 36 of the gas turbine engine. Additionally, the electric machine 246 is positioned at least partially within or aft of the turbine section along an axial direction A. In certain exemplary embodiments, the electric machine 246 and gas turbine engine depicted in FIG. 18 may be configured in substantially the same manner as the exemplary electric machine 202 and turbomachine/turbofan engine 10 described above with reference to FIG. 1. Accordingly, the same or similar numbers may refer to the same or similar parts.

For the embodiment depicted, the electric machine 246 generally includes a rotor 248 and a stator 250. The rotor 248 is attached via a one or more of rotor connection members 252 directly to the LP shaft 36, such that the rotor 248 is rotatable with the LP shaft 36. Notably, however, when integrated into one or more of the exemplary embodiments of FIGS. 1 through 5, the rotor connection members 252 may instead be coupled to e.g., a first support member (e.g., in the same manner the rotary connection member 204 is coupled to the first support member 128 in, e.g., the embodiment of FIG. 2). By contrast, the stator 250 is attached via one or more stator connection members 254 to a static frame member of the gas turbine engine, or more particularly, to a structural support member 256 of the gas turbine engine. As will be discussed in greater detail below, the connection of the rotor 248 and stator 250 of the electric machine 246 to the respective LP shaft 36 and structural support member 256 may mechanically isolate the electric machine 246. Notably, in at least certain exemplary embodiments, the electric machine 246 may be an electric generator, such that the rotor 248, and rotor connection members 252, are driven by the LP shaft 36. With such an embodiment, a rotation of the rotor 248 relative to the stator 250 may generate electrical power, which may be transferred via an electric communication bus to one or more systems of the gas turbine engine, or to a propulsion system with which the gas turbine engine is included.

Referring still to the exemplary electric motor of FIG. 18, the structural support member 256 extends from a turbine rear frame 260 (also referred to as an aft strut 260) of the gas turbine engine. The aft strut 260 may be configured as part of an aft frame assembly for the gas turbine engine. The aft strut 260 extends through the core air flowpath 37 of the gas turbine engine, and is configured to provide structural support for the gas turbine engine. The structural support member 256 also extends forward to support an aft bearing 262—the aft bearing 262 rotatably supporting an aft end of the LP shaft 36.

The stator connection member 254 may be an annular/cylindrical member extending from the structural support member 256 of the gas turbine engine. For the embodiment depicted, the stator connection member 254 supports rotation of the rotor 248 and rotor connection members 252 through one or more bearings. More specifically, a forward electric machine bearing 264 is positioned forward of the electric machine 246 and between the rotor connection member 252 and the stator connection member 254 along the radial direction R. Similarly, an aft electric machine bearing 266 is positioned aft of the electric machine 246 and between the rotor connection member 252 and the stator connection member 254 along the radial direction R. Particularly for the embodiment depicted, the forward electric machine bearing 264 is configured as a roller element bearing and the aft electric machine bearing 266 includes a pair of bearings, the pair of bearings configured as a roller element bearing and a ball bearing. It should be appreciated, however, that the forward and aft electric machine bearings 264, 266 may in other embodiments, have any other suitable configuration and the present disclosure is not intended to be limited to the specific configuration depicted, unless such limitations are added to the claims.

The gas turbine engine further includes a cavity wall 268 surrounding at least a portion of the electric machine 246. More specifically, for the embodiment depicted, the cavity wall 268 substantially completely surrounds the electric machine 246, extending from a location forward of the electric machine 246 (attached to the structural support member 256 through the stator connection member 254) to a location aft of the electric machine 246. The cavity wall 268 defines at least in part an electric machine sump 270 substantially completely surrounding the electric machine 246. More specifically, the electric machine sump 270 extends from a location forward of the electric machine 246 continuously to a location aft of the electric machine 246. Certain components include openings 272 to allow for such a continuous extension of the electric machine sump 270. Notably, for the embodiment depicted, the electric machine sump 270 additionally encloses the aft bearing 262 of the gas turbine engine. Although not depicted, the gas turbine engine may include an electric machine lubrication system for providing lubrication to, and scavenging lubrication from the electric machine sump 270. The electric machine lubrication system may remove an amount of heat from the electric machine sump 270 and electric machine 246.

In order to further reduce/maintain a temperature of the electric machine 246, the exemplary gas turbine engine depicted further includes a buffer cavity 502 surrounding at least a portion of the electric machine 246 to thermally insulate the electric machine 246. More specifically, for the embodiment depicted, the cavity wall 268 at least partially defines the buffer cavity 502. Additionally, as is seen depicted in FIG. 18, an extension member 504 is attached to or formed integrally with the structural support member 256 and extends at least partially around the cavity wall 268. Specifically, for the embodiment depicted, the structural support member 256 and extension member 504 together extend completely around the cavity wall 268. The structural support member 256 and extension member 504 together define the buffer cavity 502, which for the embodiment depicted extends continuously from a location forward of the electric machine 246 to a location aft of the electric machine 246. The buffer cavity 502 may act as an insulator from relatively hot operating temperatures within the core air flowpath 37 extending through the turbine section of the gas turbine engine.

Referring still to FIG. 18, as briefly mentioned above, the electric machine 246 is mounted, for the embodiment depicted, through one or more stator connection members 254 and one or more rotor connection members 252. The rotor connection member 252 is attached directly to a rotary component of the gas turbine engine, or more particularly, to an aft end of the LP shaft 36 for the exemplary gas turbine engine depicted. The stator connection member 254 is attached directly to a static frame member, or more particularly, to the structural support member 256 extending from the aft engine strut 260 of the gas turbine engine. Notably, the electric machine 246 is flexibly mounted to the structural support member 256, flexibly coupled to the LP shaft 36, or both. Or more particularly, for the embodiment depicted the stator connection member 254 and rotor connection member 252 are configured to flexibly mount and flexibly couple the stator 250 and rotor 248, respectively, to the structural support member 256 and LP shaft 36, respectively.

Specifically, for the embodiment depicted, the rotor connection member 252 includes one or more flexible members allowing the rotor connection member 252 to flex or bend in response to various static or dynamic forces during operation of the gas turbine engine. Similarly, for the embodiment depicted, the stator connection member 254 includes one or more flexible members allowing the stator connection member 254 to flex or bend in response to various static or dynamic forces during operation of the gas turbine engine. For the embodiment depicted, the flexible members of the rotor connection member 252 are configured as a pair of baffles 506 positioned proximate to the LP shaft 36, at a location forward of the rotor 248 along the axial direction A of the gas turbine engine. Additionally for the embodiment depicted, the flexible members of the stator connection member 254 are also configured as a pair of baffles 508 positioned proximate to the structural support member 256 at a location forward of the stator 250 along the axial direction A of the gas turbine engine. Inclusion of the flexible members with the rotor connection member 252 and the stator connection member 254 may allow for the electric machine 246 to be mechanically isolated or insulated from various forces acting on or within the gas turbine engine during operation, e.g., for increasing a useful life of the electric machine 246. As depicted, the term "baffles" refers to a section of, e.g., a cylindrical member including a plurality of bends in relatively close proximity to provide an amount of flexibility to the cylindrical member.

It should be appreciated, however, that in other embodiments, the rotor connection member 252 and stator connection member 254 may be configured in any other suitable manner for flexibly mounting and/or flexibly coupling the electric machine 246 within the gas turbine engine and to a rotary component. For example, in certain embodiments, the rotor connection member 252 and stator connection member 254 may include any other suitable flexible members configured to allow the electric machine 246 to absorb static and/or dynamic forces. For example, referring now to FIG. 19, a close-up, schematic view of a gas turbine engine including an electric machine 246 in accordance with another exemplary embodiment of the present disclosure is provided. The exemplary gas turbine engine and electric machine 246 depicted in FIG. 19 may be configured in substantially the same manner as exemplary gas turbine engine and electric machine 246 depicted in FIG. 18 and described above.

The exemplary gas turbine engine includes a rotary connection member 252 flexibly coupling a rotor 248 of an electric machine 246 to a rotary component (e.g., an LP shaft 36). The rotor connection member 252 includes a flexible element. However, for the embodiment depicted, the flexible element of the rotor connection member 252 is not configured as a pair of baffles 506. Instead, for the embodiment of FIG. 19, the flexible element of the rotor connection member 252 is configured as a flexible attachment assembly 510. More particularly, the flexible attachment assembly 510 of the rotor connection member 252 includes a splined coupling portion 512 configured to interact with a splined coupling portion 514 of the LP shaft 36. Specifically, for the embodiment depicted, the splined coupling portion 512 of the rotor connection member 252 is received over the splined coupling portion 514 of the LP shaft 36, and the rotor connection member 252 includes a damper 516 therebetween.

Figure 19:
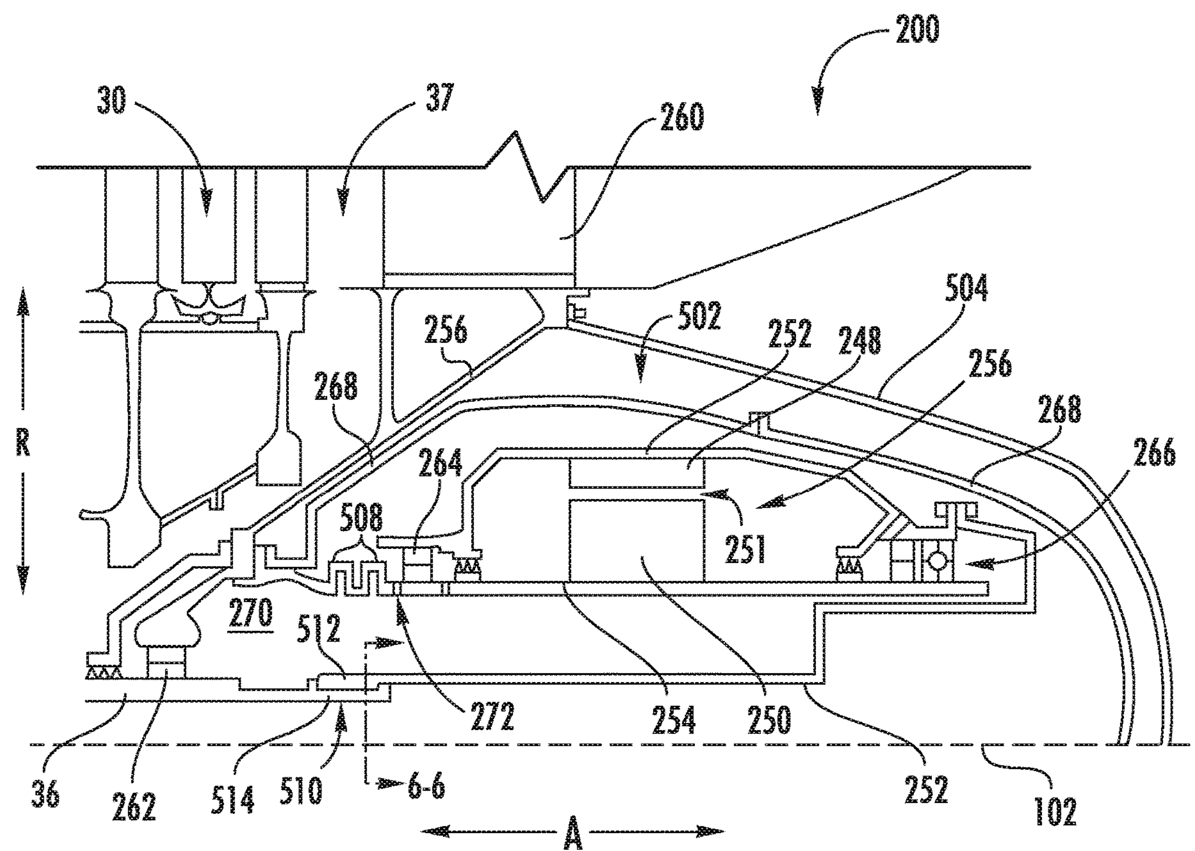
FIG. 19 is a schematic, cross-sectional view of an electric machine embedded in a gas turbine engine in accordance with another exemplary embodiment of the present disclosure.
Figure 20:
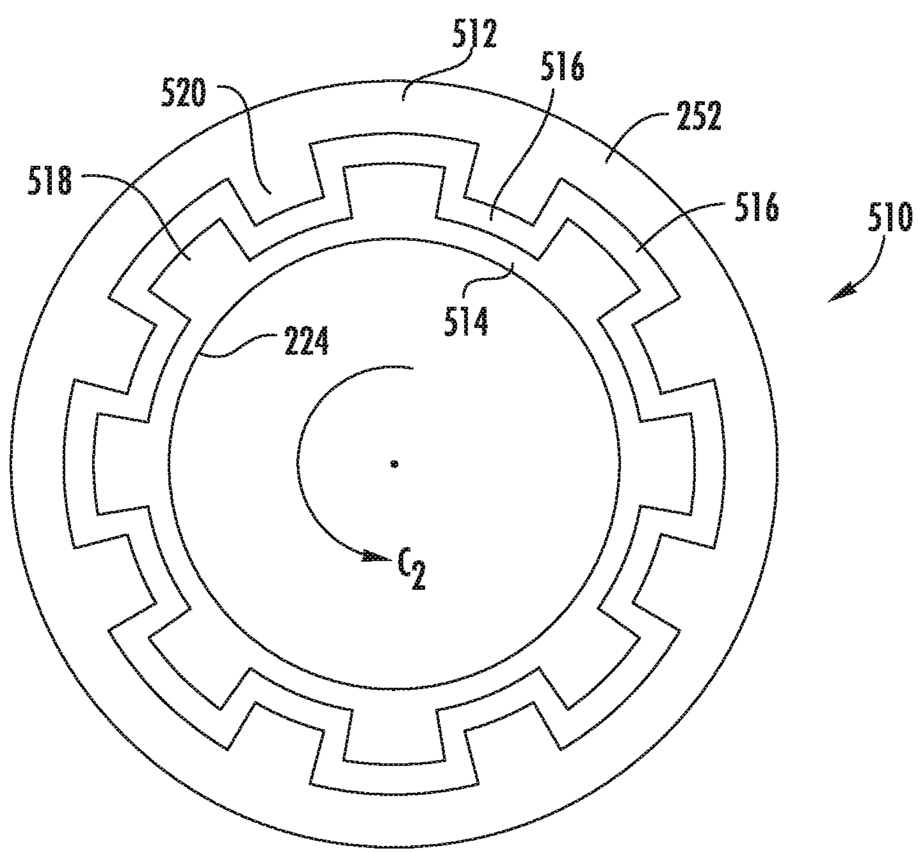
FIG. 20 is a close-up, cross-sectional view of a flexible connection member of a rotor connection member in accordance with an exemplary embodiment of the present disclosure, taken along Line 6-6 in FIG. 18.
Figure 21:
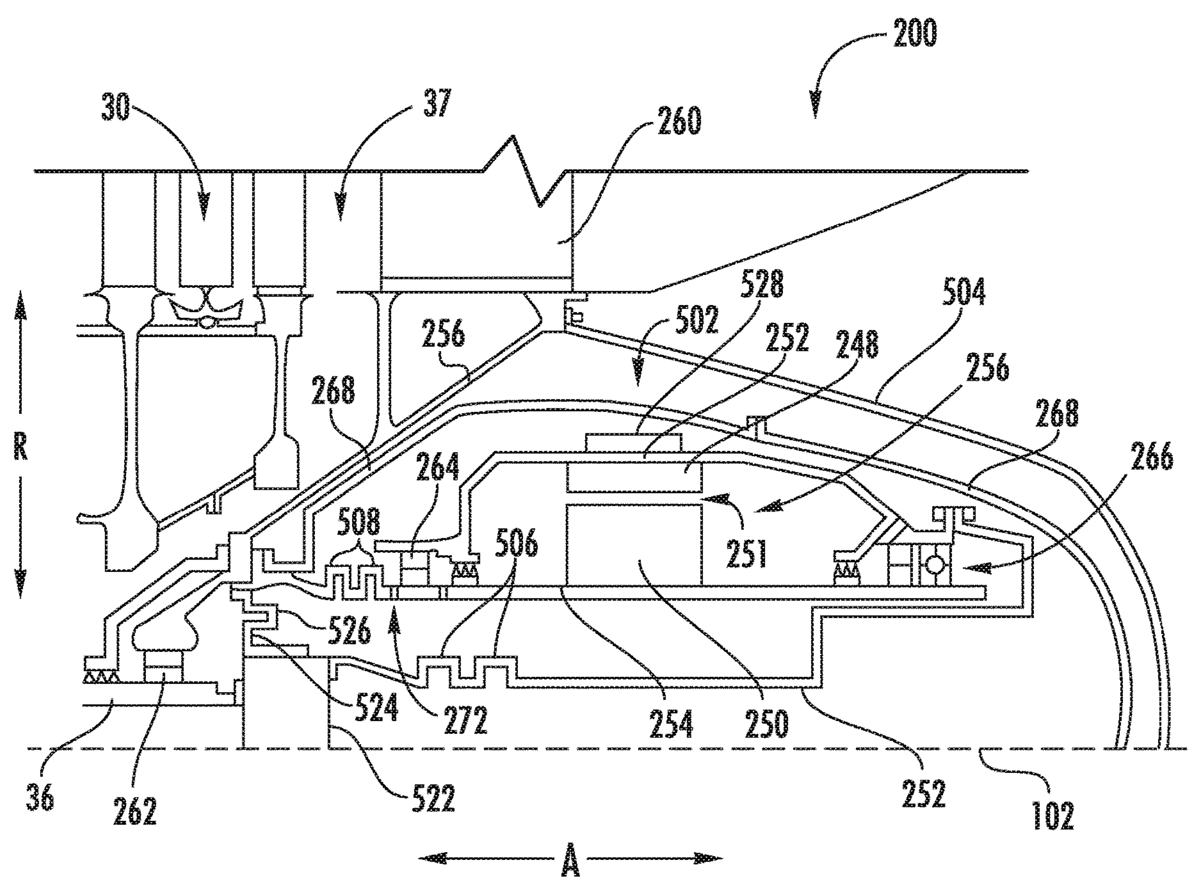
FIG. 21 is a schematic, cross-sectional view of an electric machine embedded in a gas turbine engine in accordance with yet another exemplary embodiment of the present disclosure.

Referring additionally to FIG. 20, providing a cross-sectional view of the splined coupling portions 512, 26 of the rotor connection member 252 and LP shaft 36, taken along Line 6-6 of FIG. 19, the splined coupling portion 514 of the LP shaft 36 includes a plurality of axial teeth 518 extending outward generally along a radial direction R, and spaced along a circumferential direction C. Similarly, the splined coupling portion 512 of the rotor connection member 252 includes a plurality of corresponding and complementary axial teeth 520 extending inwardly generally along the radial direction R and also spaced along the circumferential direction C. The damper 516 of the rotor connection member 252 is positioned between the splined coupling portion 514 of the LP shaft 36 and the splined coupling portion 512 of the rotor connection member 252. For the embodiment depicted, the damper 516 is configured as a dampening material extending between the axial teeth 518 and axial teeth 520 to absorb forces therebetween. In certain embodiments, the dampening material may be a resilient material, such as an elastomeric material.

However, in other embodiments, the dampening material may be any other suitable material. Additionally, in other embodiments, the damper 516 may not be configured as the dampening material, and instead may be configured as a viscous damper providing a flow of oil between the splined coupling portions of the LP shaft 36 and of the rotor connection member 252, a pneumatic damper providing an airflow between the splined coupling portions of the LP shaft 36 and of the rotor connection member 252, or any other suitable damper. When configured as a viscous damper, the damper 516 may receive a flow of oil from an electric machine lubrication system. When configured as a pneumatic damper, the damper 516 may receive a flow of compressed air from, e.g., a compressor section of the gas turbine engine.

Notably, although for the exemplary embodiment depicted, the flexible attachment member is configured between the rotor connection member 252 and the LP shaft 36, in other embodiments, the rotor connection member 252 may be configured as two separate connection members, each including a splined portion, the splined portions configured in a similar manner to achieve a similar result. Further, in other embodiments, the stator connection member 254 may include a flexible attachment member, or a flexible section, configured in a similar manner.

Inclusion of a connection member having a flexible element configured in accordance with one or more these embodiments may allow for the connection member to absorb forces along a radial direction R and along an axial direction. Moreover, inclusion of the connection member in accordance with certain of these embodiments may allow for the connection member to absorb forces along a circumferential direction C, such that the flexible element may be configured as a torsional damper for the electric machine 246. Such may be particularly beneficial for the rotary connection member, given a potential for torsional vibrations of the electric machine 246 due to, e.g., electric pulses, etc.

It should also be appreciated, that in still other embodiments, the gas turbine engine and electric machine 246 may be configured in any other suitable manner for, e.g., providing a desired electrical power output. For example, referring now to FIG. 21, a close-up, schematic view of a gas turbine engine including an electric machine 246 in accordance with yet another exemplary embodiment of the present disclosure is provided. The exemplary gas turbine engine and electric machine 246 depicted in FIG. 21 may be configured in substantially the same manner as exemplary gas turbine engine and electric machine 246 depicted in FIG. 18 and described above.

For example, the gas turbine engine includes a rotor connection member 252 supporting a rotor 248 of the electric machine 246 and a stator connection member 254 supporting a stator 250 of the electric machine 246. The rotor connection member 252 is coupled to the rotary component and the stator connection member 254 is coupled to the static support member 256. Additionally, the rotor 248 and stator 250 together define an air gap. However, for the embodiment of FIG. 21, the rotor connection member 252 is not coupled directly to the rotary component, which for the embodiment depicted is an LP shaft 36. Instead, for the embodiment of FIG. 21, the rotor connection member 252 is coupled to the LP shaft 36 through a gearbox 522, such that the electric machine 246 is mechanically driven by the LP shaft 36 through the gearbox 522. The gearbox 522 may be, e.g., a planetary gearbox, a star gearbox, or any other suitable gearbox 522 for varying a rotational speed of the rotor connection member 252 (and rotor 248) relative to the LP shaft 36. Inclusion of the gearbox 522 between the rotor connection member 252 and the LP shaft 36 may allow for the electric machine 246 to, e.g., generate a desired amount of power output by having the rotor 248 rotate at a desired rotational speed, despite the particular dimensions of a cavity within which the electric machine 246 is positioned or an operational speed of the LP shaft 36.

For example, in certain exemplary embodiments, the gearbox 522 may be configured to increase a rotational speed of the rotor 248 relative to the rotary component/LP shaft 36. Notably, with such an exemplary embodiment, the rotor 248 may be rotated at relatively high rotational speeds, potentially generating high centrifugal forces for the rotor connection member 252 and rotor 248 to withstand. Such force may widen the air gap 251 between the rotor 248 and the stator 250, potentially reducing an efficiency of the electric machine 246. Accordingly, for the embodiment depicted, a containment band 528 is provided along an outside of the rotor connection member 252 for strengthening the rotor connection member 252 and rotor 248. In certain embodiments, the band 528 may be a composite band, such as a carbon fiber wrapped band, or alternatively, may be formed of any other suitable material.

In order to allow the gearbox 522 to, e.g., absorb static and dynamic forces that may act on the gearbox 522 during operation of the gas turbine engine, the gearbox 522 is flexibly mounted to a static frame member, or rather to a structural support member 256 extending from an aft engine strut 260 of the gas turbine engine. More specifically, for the embodiment depicted, the gearbox 522 is attached to the structural support member 256 through a gearbox connection member 524. The gearbox connection member 524 includes a flexible element, which for the embodiment depicted is configured as a baffle 526. Such a configuration may increase a lifespan of the gearbox 522 by mechanically isolating or insulating the gearbox 522 from certain forces exerted on or within the gas turbine engine.

Figure 23:
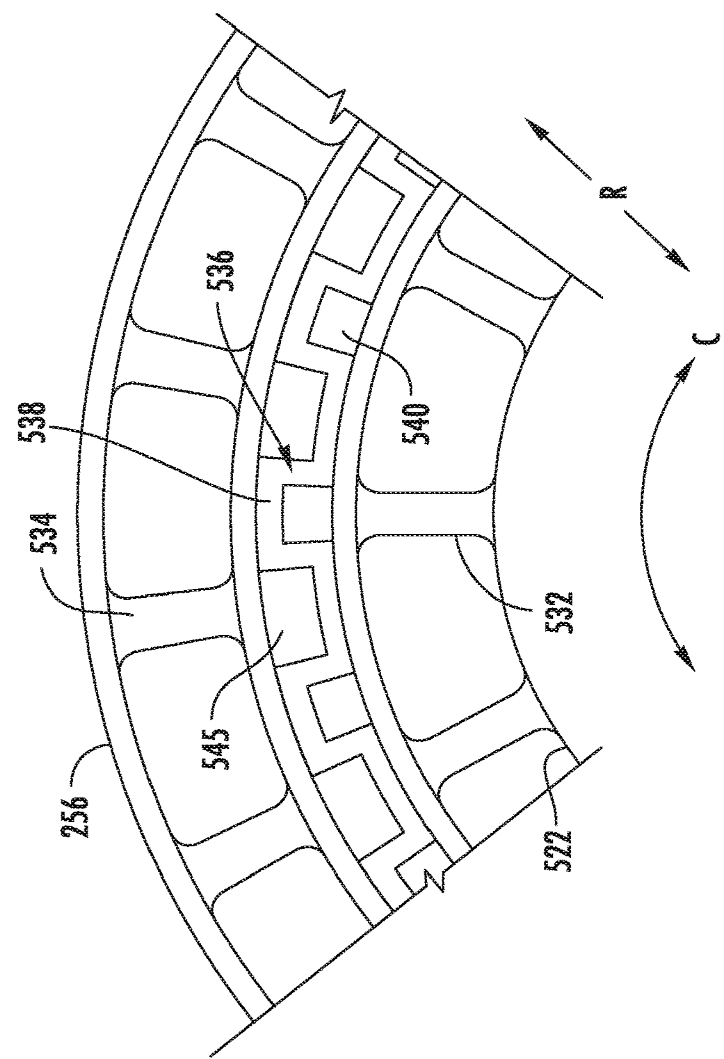
FIG. 23 is a cross-sectional view of the exemplary gearbox connection member of FIG. 22, taken along Line 9-9 in FIG. 22.
Figure 22:
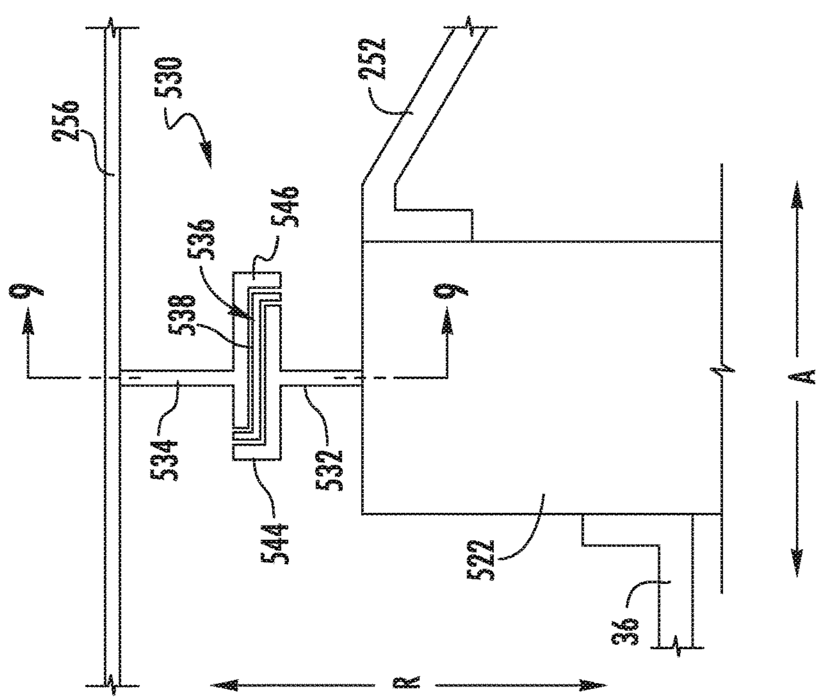
FIG. 22 is a schematic, cross-sectional, close up view of a gearbox connection member in accordance with an exemplary embodiment of the present disclosure.

It should be appreciated, however, that in other embodiments the gearbox 522 may be flexibly mounted to the structural support member 256 in any other suitable manner. For example, referring now to FIGS. 22 and 23, an alternative embodiment is depicted and described. FIG. 22 provides a close-up view of the gas turbine engine including an electric machine 246 in accordance with an exemplary aspect of the present disclosure is provided. More specifically, FIG. 22 provides a close-up view of the gearbox 522 positioned between a rotary component of the gas turbine engine and a rotor connection member 252 (extending to a rotor 248 of the electric machine 246 of the gas turbine engine). FIG. 23 provides a close-up, schematic view of a gearbox connection member 524 depicted in FIG. 22, along Line 9-9 in FIG. 22. The gas turbine engine depicted in FIGS. 22 and 23 may be configured in substantially the same manner as exemplary gas turbine engine described above terms to FIG. 21, and accordingly, the same or similar numbers may refer to the same or similar part.

The gearbox connection member 524 includes a flexible element. However, for the embodiment depicted, the flexible element is configured as a torsional damper 530 for accommodating torsional vibration of the gearbox 522 relative to the rotary component or other components of the gas turbine engine.

Particularly for the embodiment depicted, the torsional damper 530 of the gearbox connection member 524 provides dampening of the gearbox 522 along an axial direction A, along a radial direction R, and along a circumferential direction C. For example, the exemplary flexible element depicted includes a first attachment member 532 connected to the gearbox 522 and a second attachment member 534 connected to a structural support member 256. The first attachment member 532 and second attachment member 534 together define an attachment interface 536 made up of a plurality of interdigitated members with a damper 538 positioned at least partially between the interdigitated members.

For example, referring specifically to FIG. 23, the first attachment member 532 includes a plurality of circumferentially spaced teeth 540 extending outwardly generally along the radial direction R. Similarly, the second attachment member 534 includes a corresponding and complementary plurality of circumferentially spaced teeth 542 extending inwardly generally along the radial direction R. The teeth 540 of the first attachment member 532 extend into circumferential gaps defined between adjacent teeth 542 of the second attachment member 534, and conversely, the teeth 542 of the second attachment member 534 extend into circumferential gaps defined between adjacent teeth 540 of the first attachment member 532. Additionally, the damper 538 is positioned between the teeth 540 of the first attachment member 532 and the teeth 542 of the second attachment member 534.

Referring again to FIG. 22, the first attachment member 532 includes a forward lip 544 extending outwardly generally along the radial direction R, and the second attachment member 534 includes an aft lip 546 extending inwardly generally along the radial direction R. The forward lip 544 of the first attachment member 532 is configured to interface with the second attachment member 534, and the aft lip 546 of the second attachment member 534 is configured to interface with the first attachment member 532. Such a configuration may prevent movement of the first attachment member 532 relative to the second attachment member 534 along the axial direction A more than a predetermined amount. Notably, the damper 538 of the torsional damper 530 further extends between the forward lip 544 and the second attachment member 534, and also between the aft lip 546 and the first attachment member 532. However, in other embodiments, the torsional damper 530 may instead, or in addition, include any other means for limiting movement along the axial direction A. For example, in other exemplary embodiments, the torsional damper 530 may include one or more pins, bolts, etc. extending generally along the radial direction R between the first attachment member 532 and the second attachment member 534. The one or more pins, bolts, etc. may be enclosed within the damper 538 to allow for dampening along the axial direction A.

The damper 538 may be configured as a dampening material formed of any material suitable for absorbing force and/or vibration. For example, the damper 538 may be any resilient material, such as an elastomeric material. However, in other embodiments, any other suitable material or configuration may be utilized, or, any other suitable damper 538 may be provided. For example, in other embodiments, the damper 538 may be configured as a viscous damper or a pneumatic damper. For example, in certain embodiments, the dampening material may be oil, such that torsional damper 530 includes a squeeze film damper, or other similar structure.

As stated, the torsional damper 530 of the exemplary gearbox connection member 524 depicted may be capable of absorbing forces along the axial direction A, the radial direction R, and the circumferential direction C. Accordingly, a connection member in accordance with one or more embodiments of the present disclosure may be capable of extending a life of, e.g., the gearbox 522, by reducing an amount of stress or strain on the gearbox 522 (or proximally mounted components).

It should be appreciated that the flexible members described above with reference to one or more of the rotor connection member 252, stator connection member 254, and gearbox connection member 524 may be used, in other exemplary embodiments, interchangeably within any of the three connection members described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A turbomachine defining a radial direction and an axial direction, the turbomachine comprising:

a turbine section comprising a turbine frame and a turbine, the turbine comprising a first plurality of turbine rotor blades and a second plurality of turbine rotor blades, the first plurality of turbine rotor blades and second plurality of turbine rotor blades alternatingly spaced along the axial direction;

a gearbox, the first plurality of turbine rotor blades and second plurality of turbine rotor blades rotatable with one another through the gearbox about a longitudinal centerline; and an electric machine assembly comprising a rotary connection member, an electric machine, and an electric machine gearbox, the rotary connection member coupled to the first plurality of turbine rotor blades or the second plurality of turbine rotor blades, the electric machine comprising a rotor and a stator, the rotary connection member drivingly coupled to the rotor through the electric machine gearbox, wherein the rotary connection member extends radially outward of the electric machine gearbox and the rotor.

2. The turbomachine of claim 1, further comprising:

a first support member; and a spool, wherein the first plurality of turbine rotor blades is coupled to the spool through the first support member, and wherein the rotary connection member of the electric machine assembly is coupled to the first support member.

3. The turbomachine of claim 2, further comprising:

a first bearing assembly; and a second support member, the second plurality of turbine rotor blades supported by the second support member, wherein the spool and first support member are supported within the turbine section through the first bearing assembly positioned between the first support member and second support member.

4. The turbomachine of claim 3, further comprising:

a second bearing assembly, wherein the second support member is supported by the turbine frame through the second bearing assembly.

5. The turbomachine of claim 1, wherein the first plurality of turbine rotor blades is configured as a plurality of low-speed turbine rotor blades, and wherein the second plurality of turbine rotor blades is configured as a plurality of high-speed turbine rotor blades.

6. The turbomachine of claim 1, wherein the electric machine gearbox defines a gear ratio greater than 1:1 to increase a rotational speed of the rotor of the electric machine relative to the rotary connection member.

7. The turbomachine of claim 1, wherein the first plurality of turbine rotor blades is configured as a plurality of high-speed turbine rotor blades, and wherein the second plurality of turbine rotor blades is configured as a plurality of low-speed turbine rotor blades.

8. The turbomachine of claim 1, wherein the turbine frame is a turbine center frame, wherein the turbine section further comprises a turbine rear frame, and wherein the stator of the electric machine of the electric machine assembly is coupled to the turbine rear frame.

9. The turbomachine of claim 1, wherein each turbine rotor blade of the first plurality of turbine rotor blades extends between a radially inner end and a radially outer end, and wherein at least two of the turbine rotor blades of the first plurality of turbine rotor blades are spaced from one another along the axial direction and coupled to one another at the radially outer ends.

10. The turbomachine of claim 1, wherein the first plurality of turbine rotor blades are configured to rotate in a first circumferential direction, and wherein the second plurality of turbine rotor blades are configured to rotate in a second circumferential direction opposite the first circumferential direction.

11. The turbomachine of claim 1, wherein the electric machine assembly is positioned aft of the turbine.

12. The turbomachine of claim 1, wherein the electric machine of the electric machine assembly is configured to generate at least about 100 kilowatts of electrical power during operation.

13. The turbomachine of claim 1, wherein the turbine is a first turbine, wherein the turbine section further comprises a second turbine, and wherein the turbomachine further comprises:

a first spool coupled to the first turbine;

a second spool coupled to the second turbine; and a one-way clutch, the first spool selectively coupled to the second spool through the one way clutch.

14. The turbomachine of claim 13, wherein the one-way clutch is positioned between the first spool and the second spool.

15. The turbomachine of claim 13, wherein the first turbine is a low pressure turbine, wherein the first spool is a low pressure spool, wherein the second turbine is a high pressure turbine, and wherein the second spool is a high pressure spool.

16. A turbomachine defining a radial direction and an axial direction, and defining a longitudinal centerline along the axial direction, the turbomachine comprising:

a turbine section comprising a turbine frame and a turbine, the turbine comprising a first plurality of turbine rotor blades and a second plurality of turbine rotor blades, the first plurality of turbine rotor blades and second plurality of turbine rotor blades alternatingly spaced along the axial direction;

a first gearbox, the first plurality of turbine rotor blades and second plurality of turbine rotor blades rotatable with one another through the first gearbox;

an electric machine assembly comprising a rotary connection member and an electric machine, the rotary connection member coupled to the first plurality of turbine rotor blades or the second plurality of turbine rotor blades, the electric machine comprising a rotor and a stator, the rotary connection member drivingly coupled to the rotor and extending radially outward of the rotor relative to the longitudinal centerline; and an electric machine gearbox comprising a first gear coupled to the rotary connection member and a second gear coupled to the rotor, the first gear radially outward of the second gear relative to the longitudinal centerline.

17. The turbomachine of claim 16, wherein the turbine frame is a turbine center frame, wherein the turbine section further comprises a turbine rear frame, and wherein the stator of the electric machine of the electric machine assembly is coupled to the turbine rear frame.

* * * * *